United States Patent
Song et al.

(10) Patent No.: US 8,356,320 B2
(45) Date of Patent: Jan. 15, 2013

(54) TRANSMITTING/RECEIVING SYSTEM AND METHOD OF PROCESSING DATA IN THE TRANSMITTING/RECEIVING SYSTEM

(75) Inventors: Jae Hyung Song, Seoul (KR); Gomer Thomas, Arlington, WA (US)

(73) Assignee: LG Electronics Inc., Seoul (KR)

( * ) Notice: Subject to any disclaimer, the term of this patent is extended or adjusted under 35 U.S.C. 154(b) by 461 days.

(21) Appl. No.: 12/608,314

(22) Filed: Oct. 29, 2009

(65) Prior Publication Data
US 2010/0242067 A1    Sep. 23, 2010

Related U.S. Application Data

(60) Provisional application No. 61/161,411, filed on Mar. 19, 2009.

(30) Foreign Application Priority Data

Sep. 3, 2009   (KR) .................. 10-2009-0083023

(51) Int. Cl.
*H04N 7/16* (2011.01)
(52) U.S. Cl. .............. 725/62; 725/54; 725/56
(58) Field of Classification Search ........... 725/54, 725/109, 151, 56, 62; 455/3.01
See application file for complete search history.

(56) References Cited

U.S. PATENT DOCUMENTS

2009/0019494 A1 * 1/2009 Kim et al. .............. 725/54
2009/0052580 A1 * 2/2009 Song et al. ............. 375/316
2009/0070811 A1 * 3/2009 Song et al. ............. 725/39

OTHER PUBLICATIONS

Advanced Television Systems Committee (ATSC), "Candidate Standard: ATSC-M/H Standard, Part 3—Service Multiplex and Transport Subsystem Characteristics (A/153, Part 3:2009)," Doc. S4-132r11, Dec. 2008.
Advanced Television Systems Committee (ATSC), "Candidate Standard: ATSC-M/H Standard, Part 4—Announcement (A/153, Part 4:2009)," Doc. S4-133r9, Dec. 2008.

* cited by examiner

*Primary Examiner* — Brian Pendleton
*Assistant Examiner* — Nnenna Ekpo
(74) *Attorney, Agent, or Firm* — Lee, Hong. Degerman, Kang & Waimey

(57) ABSTRACT

A receiving system and a method for processing data in the receiving system are disclosed. The receiving system includes a receiving unit, a first handler, and a second handler. The receiving unit receives a broadcast signal through a mobile broadcast network. Herein, the broadcast signal includes mobile service data and a first signaling table. And, the first signaling table includes service guide transmission information and service guide bootstrapping information on the mobile service data. The first handler acquires the service guide bootstrapping information based upon the service guide transmission information included in the first signaling table. And, the second handler accesses a service guide by using the acquired service guide bootstrapping information.

12 Claims, 21 Drawing Sheets

FIG. 11

| Syntax | No. of Bits |
|---|---|
| FIC_chunk() {<br>  FIC_chunk_header()<br>  FIC_chunk_payload()<br>} | 5*8<br>var |

FIG. 12

| Syntax | No. of Bits | Format |
|---|---|---|
| FIC_chunk_header() {<br>  FIC_major_protocol_version<br>  FIC_minor_protocol_version<br>  FIC_chunk_header_extension_length<br>  ensemble_loop_header_extension_length<br>  MH_service_loop_extension_length<br>  reserved<br>  current_next_indicator<br>  transport_stream_id<br>  num_ensembles<br>} | <br>2<br>3<br>3<br>3<br>3<br>1<br>1<br>16<br>8 | <br>uimsbf<br>uimsbf<br>uimsbf<br>uimsbf<br>uimsbf<br>'1'<br>bsblf<br>uimsbf<br>uimsbf |

FIG. 13

| Syntax | No. of Bits | Format |
|---|---|---|
| FIC_chunk_payload() { | | |
|     for (i=0; i<num_ensembles; i++) { | | |
|         ensemble_id | 8 | uimsbf |
|         reserved | 3 | '111' |
|         ensemble_protocol_version | 5 | uimsbf |
|         SLT_ensemble_indicator | 1 | bslbf |
|         GAT_ensemble_indicator | 1 | bslbf |
|         reserved | 1 | '1' |
|         MH_service_signaling_channel_version | 5 | uimsbf |
|         num_MH_services | 8 | uimsbf |
|         for(j=0;j<num_MH_services;j++)} | | |
|             MH_service_id | 16 | uimsbf |
|             reserved | 3 | '111' |
|             multi_ensemble_service | 2 | uimsbf |
|             MH_service_status | 2 | uimsbf |
|             SP_indicator | 1 | bslbf |
|         } | | |
|     } | | |
|     FIC_chunk_stuffing() | var | |
| } | | |

FIG. 14

| Syntax | No. of Bits | Format |
|---|---|---|
| FIC_segment_header() { | | |
|   FIC_segment_type | 2 | uimsbf |
|   reserved | 2 | '11' |
|   FIC_chunk_major_protocol_version | 2 | uimsbf |
|   current_next_indicator | 1 | bslbf |
|   error_indicator | 1 | bslbf |
|   FIC_segment_num | 4 | uimsbf |
|   FIC_last_segment_num | 4 | uimsbf |
| } | | |

FIG. 15

| Syntax | No.of Bits | Format |
|---|---|---|
| service_map_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     SMT_protocol_version | 8 | uimsbf |
|     ensemble_id | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_MH_services | 8 | uimsbf |
|   for (i=0;i< num_MH_services; i++) { | 16*m | |
|     MH_service_id | 16 | uimsbf |
|     multi_ensemble_service | 2 | uimsbf |
|     MH_service_status | 2 | uimsbf |
|     SP_indicator | 1 | bslbf |
|     short_MH_service_name_length /*m*/ | 3 | uimsbf |
|     short_MH_service_name | 16*m | |
|     reserved | 2 | '11' |
|     MH_service_category | 6 | uimsbf |
|     num_components | 5 | uimsbf |
|     IP_version_flag | 1 | bslbf |
|     source_IP_address_flag | 1 | bslbf |
|     MH_service_destination_IP_address_flag | 1 | bslbf |
|     if (source_IP_address_flag) | | |
|       source_IP_address | 32 or 128 | uimsbf |
|     if (MH_service_destination_IP_address_flag) | | |
|       MH_service_destination_IP_address | 32 or 128 | uimsbf |
|     for (j=0;j< num_components; j++) | | |
|     { | | |
|       reserved | 1 | '1' |
|       essential_component_indicator | 1 | bslbf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | | |
|         component_destination_IP_address | 32 or 128 | uimsbf |
|       reserved | 4 | '1111' |
|       num_component_level_descriptors | 4 | uimsbf |
|       for (k=0;k< num_components_level_descriptors; k++) | | |
|       { | | |
|         component_level_descriptor() | var | |
|       } | | |
|     } | | |
|     reserved | 4 | '1111' |
|     num_MH_service_level_descriptors | 4 | uimsbf |
|     for (m=0; m<num_MH_service_level_descriptors; m++) { | | |
|       MH_service_level_descriptor() | var | |
|     } | | |
|   } | | |
|   reserved | 4 | '1111' |
|   num_ensemble_level_descriptors | 4 | uimsbf |
|   for (n=0; n<num_ensemble_level_descriptors; n++) { | | |
|     ensemble_level_descriptor() | var | |
|   } | | |
| } | | |

FIG. 16

| Syntax | No. of Bits | Format |
|---|---|---|
| guide_access_table_section() { | | |
|     table_id | 8 | 0xDC |
|     section_syntax_indicator | 1 | '0' |
|     private_indicator | 1 | '1' |
|     reserved | 2 | '11' |
|     section_length | 12 | uimsbf |
|     table_id_extension { | | |
|         GAT_protocol_version | 16 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     num_SG_providers | 8 | uimsbf |
|     for (i=0; i<num_SG_providers; i++) | | |
|     { | | |
|         SG_provider_name_length | 8 | uimsbf |
|         SG_provider_name_text | var | |
|         reserved | 3 | '111' |
|         SG_delivery_network_type | 8 | uimsbf |
|         SG_bootstrapping_data_length | 8 | uimsbf |
|         SG_bootstrap_data (SG_delivery_network_type) | var | |
|         for (j;0;j<num_SG_level_descriptors; j++) { | | |
|             SG_level_descriptor() | var | |
|         } | | |
|     } | | |
|     } | | |
|     num_additionial_descriptors | 8 | uimsbf |
|     for (k=0; k<num_additional_descriptors; k++) { | | |
|         additional_descriptor() | var | |
|     } | | |
| } | | |

FIG. 17

| SG_delivery_network_type | Meaning |
|---|---|
| 0x00 | The SG is delivered through the same M/H Broadcast where the GAT is delivered. |
| 0x01 | The SG is delivered through a different M/H Broadcast from the M/H Broadcast where the GAT is delivered. |
| 0x02 | The SG is delivered through the associated different IP-based broadcast channel. |
| 0x03 | The SG is delivered through an interaction channel. |
| 0x04 ~ 0x1F | Reserved for future use |

FIG. 18

| Syntax | No. of Bits | Format |
|---|---|---|
| SG_bootstrap_data() {<br>    MH_service_id<br>    announcement_channel_TSI<br>} | <br>16<br>16 | <br>uimsbf<br>uimsbf |

FIG. 19

| Syntax | No. of Bits | Format |
|---|---|---|
| SG_bootstrap_data() {<br>    transport_stream_id<br>    MH_service_id<br>    announcement_channel_TSI<br>} | <br>16<br>16<br>16 | <br>uimsbf<br>uimsbf<br>uimsbf |

FIG. 20

| Syntax | No. of Bits | Format |
|---|---|---|
| SG_bootstrap_data() {<br>    reserved<br>    IP_version_flag<br>    source_IP_address_flag<br>    if (source_IP_address_flag)<br>        SG_bootstrap_source_IP_address<br>    SG_bootstrap_destination_IP_address<br>    SG_bootstrap_destination_UDP_port_num<br>    announcement_channel_TSI<br>} | <br>6<br>1<br>1<br><br>32 or 128<br>32 or 128<br>16<br>16 | <br>'111111'<br>bslbf<br>bslbf<br><br>uimsbf<br>uimsbf<br>uimsbf<br>uimsbf |

FIG. 21

| Syntax | No. of Bits | Format |
|---|---|---|
| SG_bootstrap_data() {<br>    SG_entrypoint_URL_text_length<br>    SG_entrypoint_URL_text()<br>} | 8<br>var | uimsbf<br>uimsbf |

US 8,356,320 B2

TRANSMITTING/RECEIVING SYSTEM AND METHOD OF PROCESSING DATA IN THE TRANSMITTING/RECEIVING SYSTEM

Pursuant to 35 U.S.C. §119, this application claims the benefit of earlier filing date and right of priority to Korean Application No. 10-2009-0083023, filed on Sep. 3, 2009, and also claims the benefit of U.S. Provisional Application Ser. No. 61/161,411, filed on Mar. 19, 2009, the contents of which are all incorporated by reference herein in their entirety.

BACKGROUND OF THE INVENTION

1. Field of the Invention

The present invention relates to a transmitting system for transmitting data for broadcast, a receiving system (or receiver) for receiving data transmitted from the transmitting system, and a method of processing data in the transmitting system and the receiving system (or receiver).

2. Discussion of the Related Art

The Vestigial Sideband (VSB) transmission mode, which is adopted as the standard for digital broadcasting in North America and the Republic of Korea, is a system using a single carrier method. Therefore, the receiving performance of the receiving system may be deteriorated in a poor channel environment. Particularly, since resistance to changes in channels and noise is more highly required when using portable and/or mobile broadcast receivers, the receiving performance may be even more deteriorated when transmitting mobile service data by the VSB transmission mode.

SUMMARY OF THE INVENTION

Accordingly, the present invention is directed to a digital broadcasting transmitting/receiving system and a data processing method that substantially obviate one or more problems due to limitations and disadvantages of the related art.

An object of the present invention is to provide a digital broadcasting transmitting/receiving system and a data processing method that are highly resistant to channel changes and noise.

Another object of the present invention is to provide a receiving system and a method for processing data that can efficiently receive a service guide.

Another object of the present invention is to provide a receiving system and a method for processing data that can receive bootstrapping information of a service guide.

Another object of the present invention is to provide a receiving system and a method for processing data that can receive bootstrapping information of a service guide being transmitted through a mobile broadcast signal of different channel.

Another object of the present invention is to provide a receiving system and a method for processing data that can receive bootstrapping information of a service guide being transmitted through a different broadcasting network.

A further object of the present invention is to provide a receiving system and a method for processing data that can receive bootstrapping information of a service guide being transmitted through a bi-directional (or two-way or interaction) channel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a data processing method in a receiving system includes the steps of receiving a broadcast signal through a mobile broadcast network, wherein the broadcast signal includes mobile service data and a first signaling table, and wherein the first signaling table includes service guide transmission information and service guide bootstrapping information on the mobile service data, acquiring the service guide bootstrapping information based upon the service guide transmission information included in the first signaling table, and accessing a service guide by using the acquired service guide bootstrapping information.

Herein, when the service guide transmission information indicates that the service guide is included and transmitted in the broadcast signal including the mobile service data, the service guide bootstrapping information may include an identifier of a mobile service including the service guide and a transmission session identifier for an announcement channel of the service guide.

When the service guide transmission information indicates that the service guide is included and transmitted in a broadcast signal of a physical channel different from a physical channel of the broadcast signal including the mobile service data, the service guide bootstrapping information may include a transport stream identifier of the broadcast signal including the service guide, an identifier of the mobile service including the service guide, and a transmission session identifier on an announcement channel of the service guide.

When the service guide transmission information indicates that the service guide is transmitted to a broadcast network other than the mobile broadcast network, the service guide bootstrapping information may include IP access information on an announcement channel of the service guide, and a transmission session identifier on an announcement channel of the service guide.

And, finally, when the service guide transmission information indicates that the service guide is transmitted through an interaction channel, the service guide bootstrapping information may include a uniform resource locator (URL) indicating an entry point location of the service guide.

In another aspect of the present invention, a receiving system includes a receiving unit, a first handler, and a second handler. The receiving unit receives a broadcast signal through a mobile broadcast network. Herein, the broadcast signal includes mobile service data and a first signaling table. And, the first signaling table includes service guide transmission information and service guide bootstrapping information on the mobile service data. The first handler acquires the service guide bootstrapping information based upon the service guide transmission information included in the first signaling table. And, the second handler accesses a service guide by using the acquired service guide bootstrapping information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 11 illustrates a syntax structure of an FIC chunk according to an embodiment of the present invention;

FIG. 12 illustrates a syntax structure of an FIC chunk header according to an embodiment of the present invention;

FIG. 13 illustrates a syntax structure of an FIC chunk payload according to an embodiment of the present invention;

FIG. 14 illustrates a syntax structure of an FIC segment header according to an embodiment of the present invention;

FIG. 15 illustrates a syntax structure of a service map table (SMT) according to an embodiment of the present invention;

FIG. 16 illustrates a syntax structure of a guide access table (GAT) section according to an embodiment of the present invention;

FIG. 17 illustrates exemplary significance for each SG_delivery_network_type field value of FIG. 16;

FIG. 18 illustrates a syntax structure of SG bootstrapping information SG_bootstrap_data( ) according to an embodiment of the present invention, when the SG_delivery_network_type field value is equal to '0x00';

FIG. 19 illustrates a syntax structure of SG bootstrapping information SG_bootstrap_data( ) according to an embodiment of the present invention, when the SG_delivery_network_type field value is equal to '0x01';

FIG. 20 illustrates a syntax structure of SG bootstrapping information SG_bootstrap_data( ) according to an embodiment of the present invention, when the SG_delivery_network_type field value is equal to '0x02';

FIG. 21 illustrates a syntax structure of SG bootstrapping information SG_bootstrap_data( ) according to an embodiment of the present invention, when the SG_delivery_network_type field value is equal to '0x03';

DETAILED DESCRIPTION OF THE INVENTION

Figure 1:
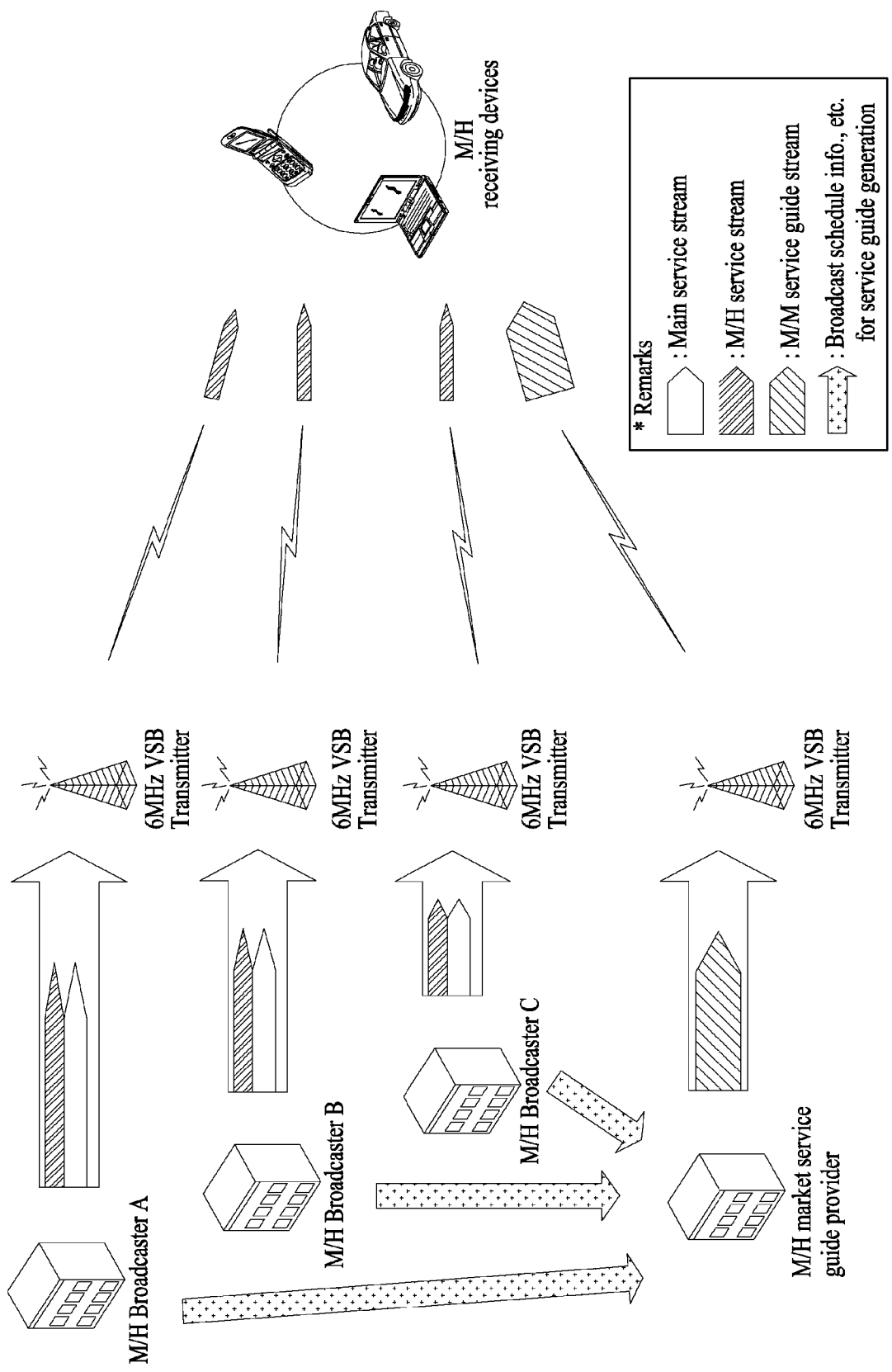
FIG. 1 illustrates an example of an SG being transmitted through another physical channel according to the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Among the terms used in the description of the present invention, main service data correspond to data that can be received by a fixed receiving system and may include audio/video (A/V) data. More specifically, the main service data may include A/V data of high definition (HD) or standard definition (SD) levels and may also include diverse data types required for data broadcasting. Also, the known data correspond to data pre-known in accordance with a pre-arranged agreement between the receiving system and the transmitting system.

Additionally, among the terms used in the present invention, "M/H" (or MH) corresponds to the initials of "mobile" and "handheld" and represents the opposite concept of a fixed-type system. Furthermore, the M/H service data may include at least one of mobile service data, and handheld service data, and will also be referred to as "mobile service data" for simplicity. Herein, the mobile service data not only correspond to M/H service data but may also include any type of service data with mobile or portable characteristics. Therefore, the mobile service data according to the present invention are not limited only to the M/H service data. Also, data required for mobile service according to the present invention will also be referred to as "mobile service data" for simplicity.

The above-described mobile service data may correspond to data having information, such as program execution files, stock information, and so on, and may also correspond to A/V data. Most particularly, the mobile service data may correspond to A/V data having lower resolution and lower data rate as compared to the main service data. For example, if an A/V codec that is used for a conventional main service corresponds to a MPEG-2 codec, a MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information may be transmitted as the main service data.

Also, a data service using the mobile service data may include weather forecast services, traffic information services, stock information services, viewer participation quiz programs, real-time polls and surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above. In the present invention, the transmitting system provides backward compatibility in the main service data so as to be received by the conventional receiving system. Herein, the main service data and the mobile service data are multiplexed to the same physical channel and then transmitted.

In the present invention, the transmitting system provides backward compatibility in the main service data so as to be received by the conventional receiving system. Herein, the main service data and the mobile service data are multiplexed to the same physical channel and then transmitted.

Furthermore, the transmitting system according to the present invention performs additional encoding on the mobile service data and inserts the data already known by the receiving system and transmitting system (e.g., known data), thereby transmitting the processed data.

Therefore, when using the transmitting system according to the present invention, the receiving system may receive the mobile service data during a mobile state and may also receive the mobile service data with stability despite various distortion and noise occurring within the channel.

Herein, the transmitting system corresponds to one mobile broadcast station. And, the mobile broadcast station transmits main service data and mobile service data to each receiving system (also referred to as a receiver or a terminal) by using a physical channel. More specifically, each mobile broadcast station uses a 6 MHz VSB transmitter to transmit the main service data along with the mobile service data.

At this point, a service guide (SG) delivering announcement information with respect to the mobile service data may be transmitted by using a variety of methods.

In the description of the present invention, the signaling information required for receiving (or accessing) the SG will be referred to as a service guide bootstrapping information. More specifically, the service guide bootstrapping information is information required to bootstrap the SG. According to an embodiment of the present invention, the service guide bootstrapping information is signaled to a guide access table (GAT).

For example, the service guide (SG) may be transmitted through the same physical channel as that of the corresponding mobile service data (i.e., through the same mobile broadcast) along with the corresponding mobile service data. In this case, the service guide bootstrapping information required for accessing the SG is signaled to the GAT, which is transmitted to the physical channel.

According to another embodiment of the present invention, the service guide may be transmitted through a physical channel other than the physical channel through which the corresponding mobile service data are being transmitted. For example, as shown in FIG. 1, a market service guide provider may gather (or collect) information for the service guide being provided from each mobile broadcast station (e.g., schedule information on mobile services) so as to configure a consolidated service guide (SG). Thereafter, the market service guide provider may transmit the configured consolidated SG through a separate channel (e.g., a 6 MHz-band VSB transmitter). At this point, the market service guide provider holds a physical channel for a separate mobile broadcast signal (i.e., a physical tuning channel (PTC) spectrum). And, the market service guide provider gathers and combines the information for service guides provided from each mobile broadcast station, thereby producing a consolidated SG. Thereafter, the consolidated SG is transmitted to each receiving system through the physical channel held by the market service guide provider. In this case, the present invention transmits the service guide bootstrapping information, which is used to enable the receiving system to receive and process the consolidated SG, through the same physical channel as that of the respective mobile service data. More specifically, when the service guide for the mobile service data is transmitted through a physical channel other than that through which the mobile service data are transmitted, the service guide bootstrapping information, which enables the receiving system to receive and process the corresponding service guide, is signaled to the GAT, so that the service guide bootstrapping information can be transmitted along with the respective mobile service data through the same physical channel.

Figure 2:
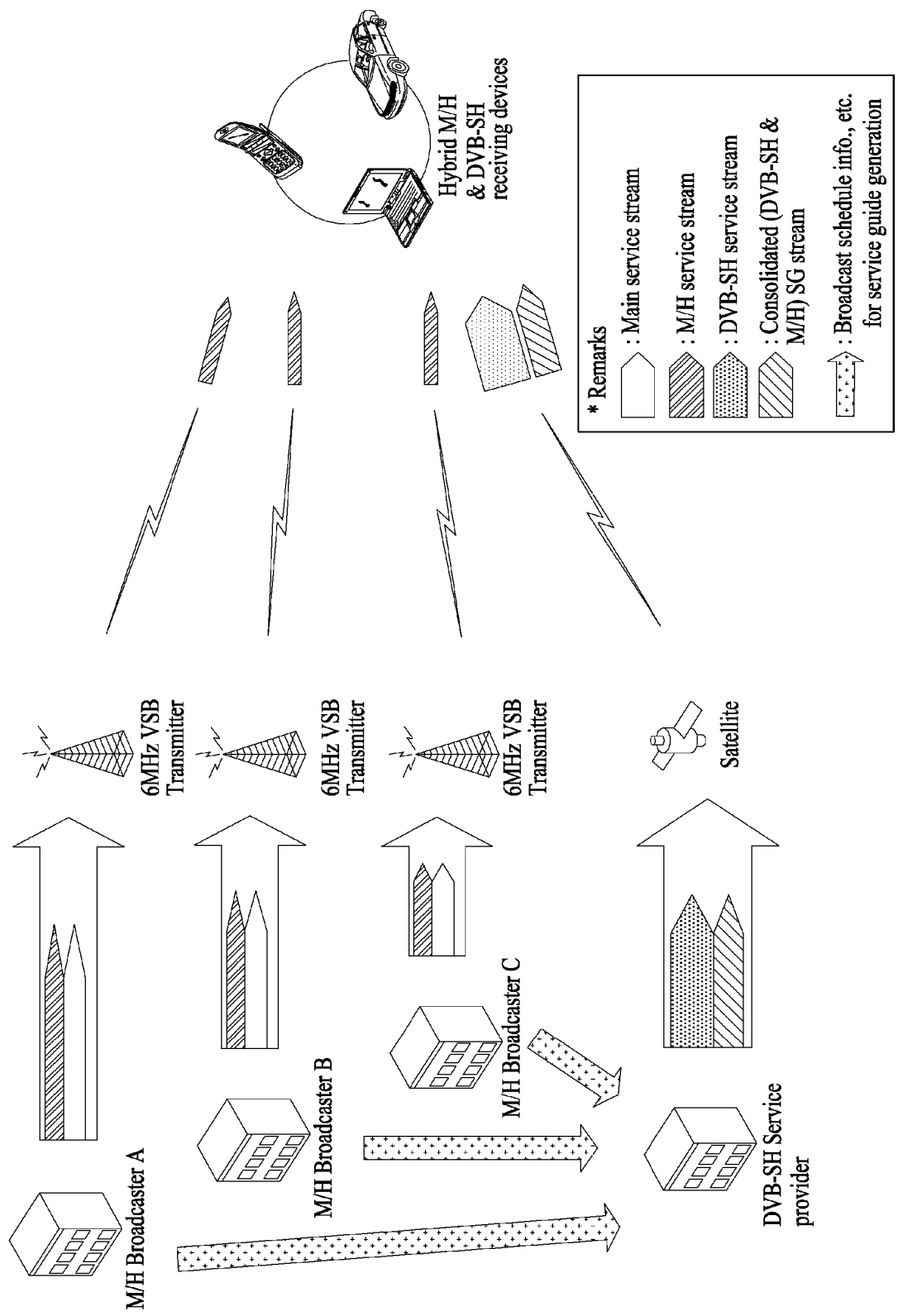
FIG. 2 illustrates an example of an SG being transmitted through another broadcast network according to the present invention.

According to yet another embodiment of the present invention, instead of being transmitted via a mobile broadcast network, the service guide may be transmitted through a different broadcast network (e.g., a broadcast network of a different IP-base). For example, as shown in FIG. 2, in a hybrid system consisting of a combination of a terrestrial mobile system according to the present invention and a digital video broadcasting satellite services to handhelds (DVB-SH) system, which is used for European portable (or mobile) digital satellite TV broadcasting, DVB-SH operators (e.g., DVB-SH service providers) may gather and combine the information for service guides (e.g., schedule information on the corresponding mobile service) provided from a mobile broadcast station, so as to transmit the combined information to each receiving system through a DVB-SH network (i.e., satellite).

At this point, each mobile broadcast station transmits main service data and mobile service data to each receiving system by using a physical channel assigned to the respective broadcast station. More specifically, a broadcast signal including the main service data and the mobile service data is transmitted through a mobile (M/H) broadcast network according to the present invention. In this case, the present invention transmits the service guide bootstrapping information, which is used to enable the receiving system to receive the SG transmitted from a different broadcast network and process the received SG, through the same physical channel as that of the respective mobile service data.

More specifically, when the service guide is transmitted through a different physical channel, instead of being transmitted through the mobile broadcast network through which the corresponding mobile service data are transmitted, the service guide bootstrapping information, which enables the receiving system to receive and process the corresponding service guide, is signaled to the GAT, so that the service guide bootstrapping information can be transmitted along with the respective mobile service data through the same physical channel.

Figure 3:
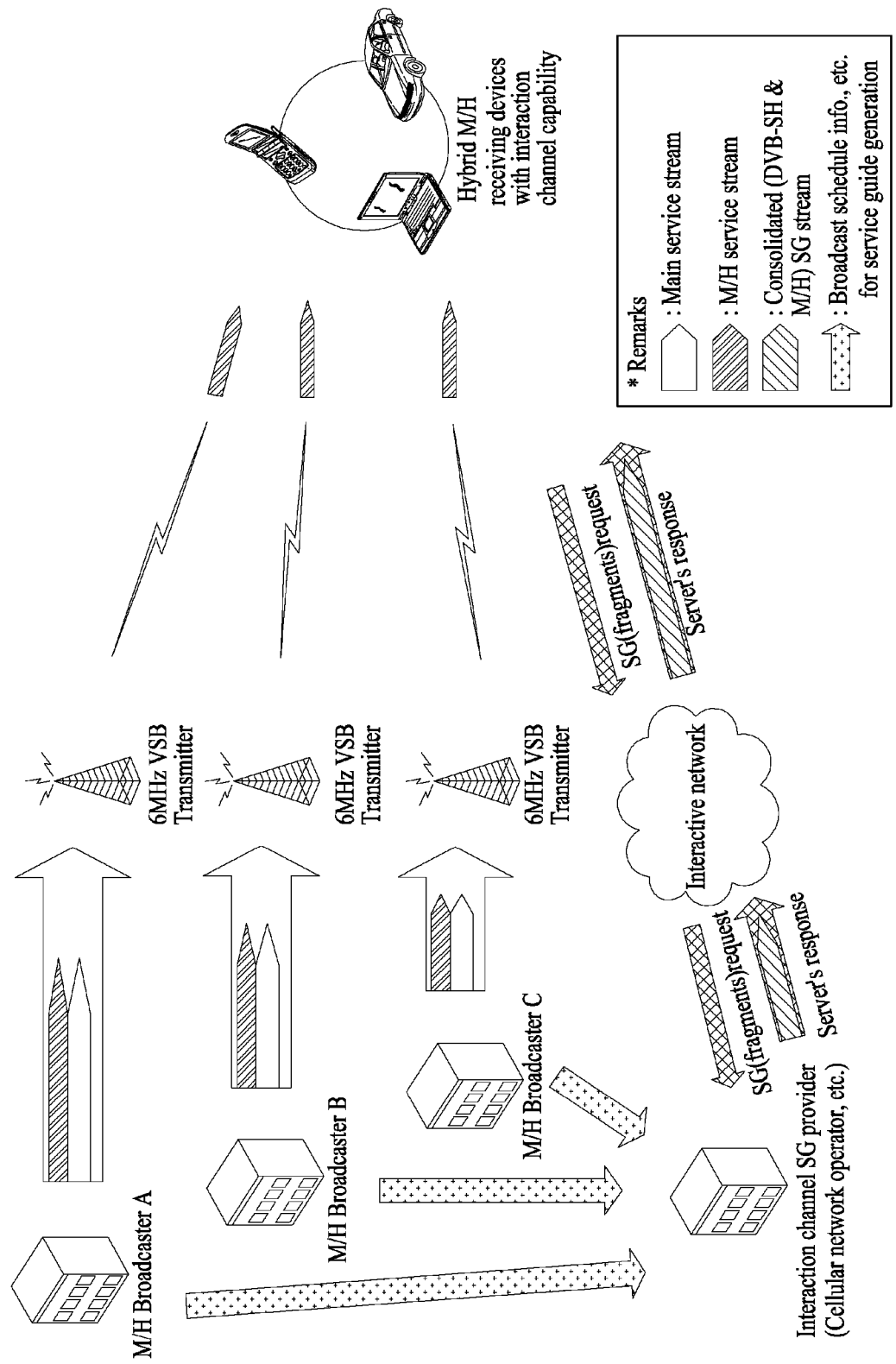
FIG. 3 illustrates an example of an SG being transmitted through interaction channel according to the present invention.

According to yet another embodiment of the present invention, the service guide may be transmitted through a two-way (or bi-directional or interaction) channel. For example, as shown in FIG. 3, in a hybrid system configured by a combination of a terrestrial mobile system and a two-way channel system (e.g., a cellular system), a two-way channel SG provider (e.g., an operator or server manager equipped with a two-way channel network, such as a cellular network operator) may gather and combine the information for service guides (e.g., schedule information on the corresponding mobile service) provided from a mobile broadcast station, so as to transmit the combined information to each receiving system through a two-way channel. At this point, each mobile broadcast station transmits main service data and mobile service data to each receiving system by using a physical channel assigned to the respective broadcast station. More specifically, a broadcast signal including the main service data and the mobile service data is transmitted through a mobile (M/H) broadcast network according to the present invention. In this case, the present invention transmits the service guide bootstrapping information, which is used to enable the receiving system to receive the SG transmitted from the two-way channel and process the received SG, through the same physical channel as that of the respective mobile service data. More specifically, when the service guide is transmitted through a two-way channel, instead of being transmitted through the mobile (i.e., M/H) broadcast network through which the corresponding mobile service data are transmitted, the service guide bootstrapping information, which enables the receiving system to receive and process the corresponding service guide, is signaled to the GAT, so that the service guide bootstrapping information can be transmitted along with the respective mobile service data through the same physical channel.

According to an embodiment of the present invention, the transmitting system and the receiving system operate two different types of data channels: an RS frame data channel for transmitting contents and a fast information channel (FIC) data channel for acquisiting service. More specifically, the present invention can signal mapping information between an ensemble and a mobile service by using an FIC chunk, and can divide and transmit the FIC chunk into FIC segment units, thereby enabling a receiving system to perform quick service acquisition.

More specifically, in the transmitting system (e.g., mobile broadcast station), the mobile service data (e.g., A/V steaming) are packetized based upon a real time protocol (RTP) method. The RTP packet is then packetized once again based upon a user datagram protocol (UDP) method. Thereafter, the RTP/UDP packet is in turn packetized based upon an IP method, thereby being packetized into RTP/UDP/IP packet data. In the description of the present invention, the packetized RTP/UDP/IP packet data will be referred to as an IP datagram for simplicity.

Furthermore, service information for receiving mobile services may be provided in the form of a signaling table. And, a service signaling channel transmitting such signaling table is packetized based upon a UDP method. And, the packetized UDP data are then packetized based upon an IP method, thereby being packetized into UDP/IP data. In the description of the present invention, the packetized UDP/IP packet data will also be referred to as an IP datagram for simplicity. According to an embodiment of the present invention, the service signaling channel is encapsulated into an IP datagram having a well-known destination IP address and a well-known destination UDP port number.

In the transmitting system (e.g., mobile broadcast station), an RS frame is formed by gathering the IP datagrams of the mobile service data and the service signaling channel, and data of the RS frame are distributed to a plurality of data groups. Thereafter, the distributed data modulated by using a predetermined transmission method, e.g., a VSB transmission method, thereby transmitting the modulated data. According to the embodiment of the present invention, an FIC segment is included in each of the data groups. The relation between the RS Frame and the FIC segment will be described in detail in a later process.

More specifically, one RS frame includes an IP datagram of mobile service data for at least one or more mobile services and an IP datagram of a service signaling channel for receiving the mobile service data.

Also, the concept of an ensemble is applied in an embodiment of the present invention, so as to define a collection of services. One ensemble (also referred to as an M/H ensemble) has the same QoS and is encoded with the same FEC code. Also, each ensemble has a unique ensemble identifier (i.e., ensemble id) and corresponds to a correction of consecutive RS frames having the same FEC code. At this point, each RS frame in encapsulated to transport packets including an IP stream (i.e., IP datagram). In other words, the RS frame corresponds to a two-dimensional data frame through which an ensemble is RS-CRC encoded.

Figure 4:
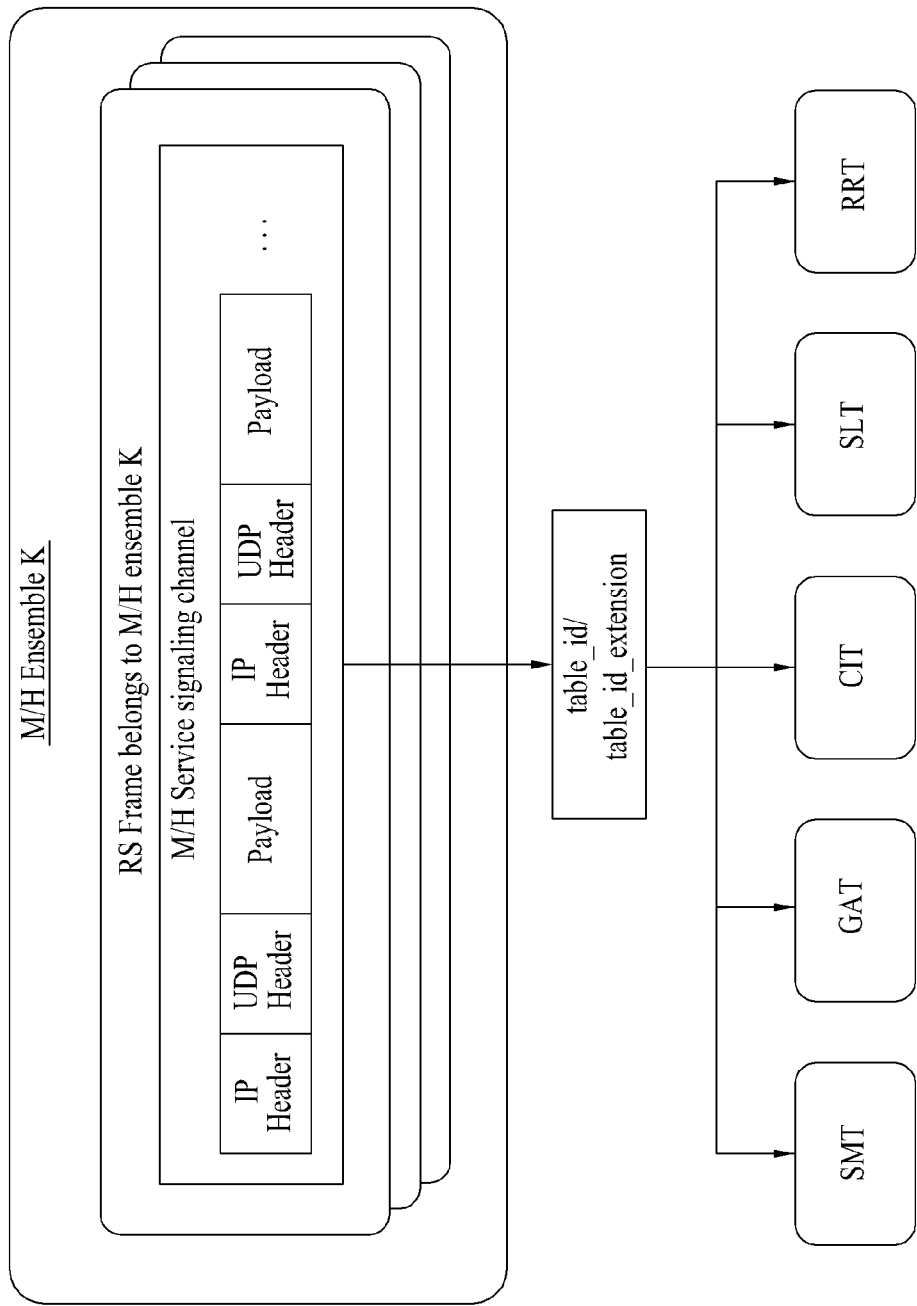
FIG. 4 illustrates an example of signaling tables being included in a service signaling channel according to the present invention.

FIG. 4 illustrates a structure of a service signaling channel according to an embodiment of the present invention. Herein, FIG. 4 illustrates the structure of a service signaling channel in an RS frame belonging to ensemble K. According to the embodiment of the present invention, among a service map table (SMT), a guide access table (GAT), a cell information table (CIT), a service labeling table (SLT), and a rating region table (RRT), the present invention transmits at least one signaling table, as shown in FIG. 4, through the service signaling channel. Herein, the signaling tables presented in the embodiment of the present invention are merely examples for facilitating the understanding of the present invention. Therefore, the present invention is not limited only to the exemplary signaling tables that can be transmitted through the service signaling channel.

The SMT provides signaling information on ensemble levels. Also, each SMT provides IP access information for each mobile service belonging to the corresponding ensemble including each SMT. Furthermore, the SMT provides IP stream component level information required for the corresponding mobile service.

The RRT transmits information on region and consultation organs for program ratings. More specifically, the RRT provides content advisory rating information.

The GAT provides information on SG providers, which transmit the service guides. Also, the GAT provides service guide bootstrapping information required for accessing the SG. The service guide bootstrapping information is provided for each SG provider. And, the service guide bootstrapping information varies depending upon the method for transmitting the SG. Herein, the service guide bootstrapping information includes access information on the SG and may further include a transmission session identifier of the announcement channel.

The CIT provides channel information of each cell, which corresponds to the frequency domain of a broadcast signal. Herein, a cell refers to a scope affected (or influenced) by a transmitter based upon a physical frequency in a multi-frequency network (MFN) environment (or condition). More specifically, the CIT provides information on a carrier wave frequency of an adjacent cell in the current transmitter (or transmitting system). Therefore, based upon the CIT information, a receiver (or receiving system) can travel from one transmitter's (or exciter's) coverage area to another.

The SLT provides minimum required information for an exclusive usage of a channel scan process. More specifically, according to the embodiment of the present invention, other than the SMT, by using the SLT for the exclusive usage of the channel scan process, so as to configure a set of minimum information for the channel scan process, the channel scanning speed may be increased.

According to an embodiment of the present invention, each signaling table is divided into at least one section. Then, each section is encapsulated to a UDP/IP header, thereby being transmitted through the service signaling channel. In this case, the number of UDP/IP packets being transmitted through the service signaling channel may vary based upon the number of signaling tables being transmitted through the service signaling channel and the number of sections in each signaling table.

At this point, all UDP/IP packets transmitted through the service signaling channel have the same number of well-known target IP addresses and well-known target UDP port numbers. For example, when it is assumed that the SMT, RRT, and GAT are transmitted through the service signaling channel, the target IP address and target UDP port number of all UDP/IP packets transmitting the SMT, RRT, and GAT are identical to one another. Furthermore, the target IP address and the target UDP port number respectively correspond to well-known values, i.e., values pre-known by the receiving system based upon an agreement between the receiving system and the transmitting system.

Therefore, the identification of each signaling table included in the service signaling data is performed by a table identifier. The table identifier may correspond to a table_id field existing in the corresponding signaling table or in the header of the corresponding signaling table section. And, when required, identification may be performed by further referring to a table_id_extension field.

Data Format Structure

The data structure used in the mobile broadcasting technology according to the embodiment of the present invention may include a data group structure and an RS frame structure, which will now be described in detail.

Figure 5:
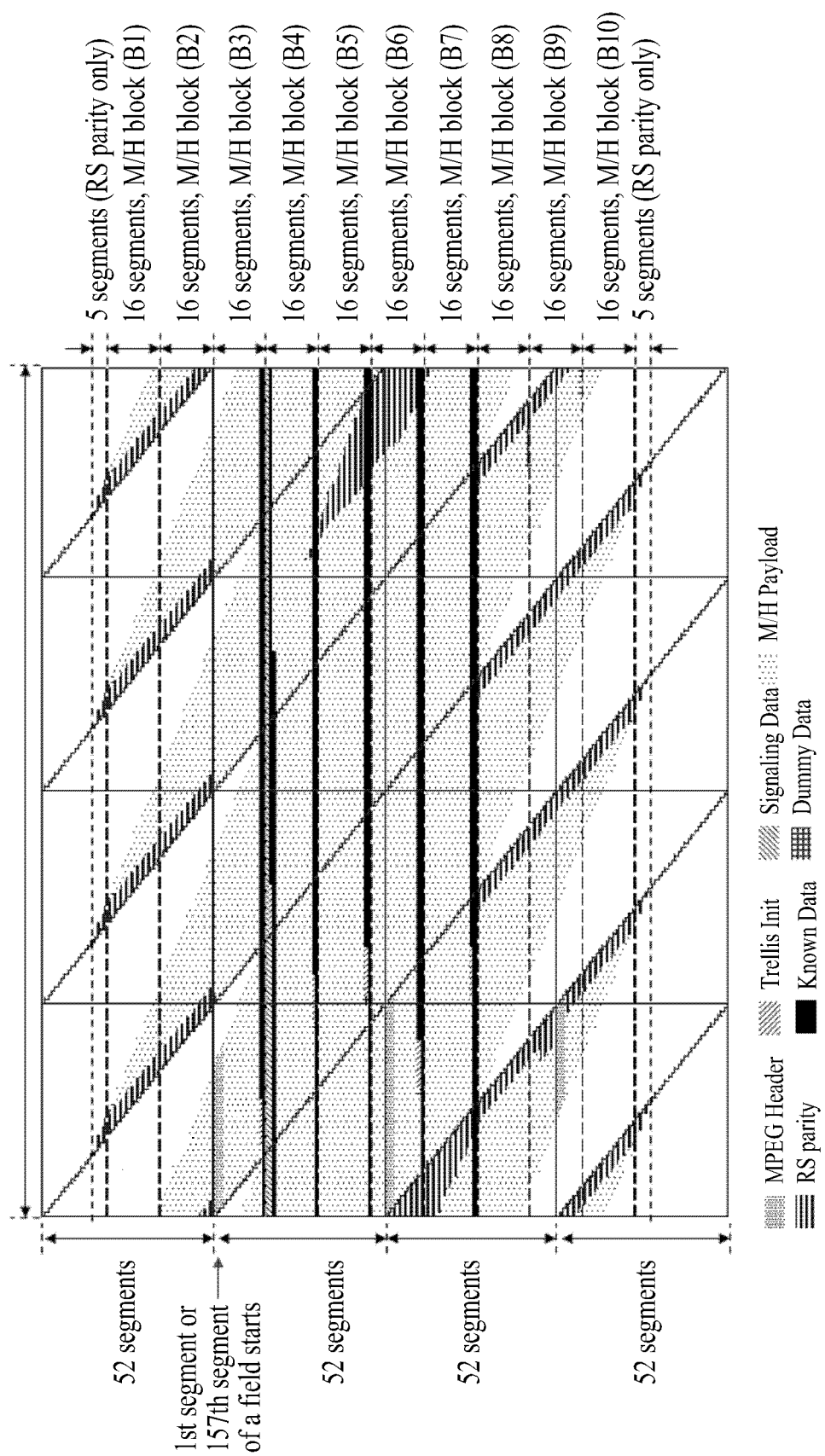
FIG. 5 illustrates a data group structure according to an embodiment of the present invention.

FIG. 5 illustrates an exemplary structure of a data group according to the present invention. FIG. 5 shows an example of dividing a data group according to the data structure of the present invention into 10 M/H blocks (i.e., M/H block 1 (B1) to M/H block 10 (B10)). In this example, each M/H block has the length of 16 segments. Referring to FIG. 5, only the RS parity data are allocated to portions of the 5 segments before the M/H block 1 (B1) and the 5 segments following the M/H block 10 (B10). The RS parity data are excluded in regions A to D of the data group. More specifically, when it is assumed that one data group is divided into regions A, B, C, and D, each M/H block may be included in any one of region A to region D depending upon the characteristic of each M/H block within the data group.

Herein, the data group is divided into a plurality of regions to be used for different purposes. More specifically, a region of the main service data having no interference or a very low interference level may be considered to have a more resistant (or stronger) receiving performance as compared to regions having higher interference levels. Additionally, when using a system inserting and transmitting known data in the data group, wherein the known data are known based upon an agreement between the transmitting system and the receiving system, and when consecutively long known data are to be periodically inserted in the mobile service data, the known data having a predetermined length may be periodically inserted in the region having no interference from the main service data (i.e., a region wherein the main service data are not mixed). However, due to interference from the main service data, it is difficult to periodically insert known data and also to insert consecutively long known data to a region having interference from the main service data.

In the data group, the data included in a RS frame will be referred to as "mobile service data" for simplicity. The RS frame data (or the data of the RS frame) will be described in more detail in a later process.

Referring to FIG. 5, M/H block 4 (B4) to M/H block 7 (B7) correspond to regions without interference of the main service data. M/H block 4 (B4) to M/H block 7 (B7) within the data group shown in FIG. 5 correspond to a region where no interference from the main service data occurs. In this example, a long known data sequence is inserted at both the beginning and end of each M/H block. In the description of the present invention, the region including M/H block 4 (B4) to M/H block 7 (B7) will be referred to as "region A (=B4+ B5+B6+B7)". As described above, when the data group includes region A having a long known data sequence inserted at both the beginning and end of each M/H block, the receiving system is capable of performing equalization by using the channel information that can be obtained from the known data. Therefore, the strongest equalizing performance may be yielded (or obtained) from one of region A to region D.

In the example of the data group shown in FIG. 5, M/H block 3 (B3) and M/H block 8 (B8) correspond to a region having little interference from the main service data. Herein, a long known data sequence is inserted in only one side of each M/H block B3 and B8. More specifically, due to the interference from the main service data, a long known data sequence is inserted at the end of M/H block 3 (B3), and another long known data sequence is inserted at the beginning of M/H block 8 (B8). In the present invention, the region including M/H block 3 (B3) and M/H block 8 (B8) will be referred to as "region B (=B3+B8)". As described above, when the data group includes region B having a long known data sequence inserted at only one side (beginning or end) of each M/H block, the receiving system is capable of performing equalization by using the channel information that can be obtained from the known data. Therefore, a stronger equalizing performance as compared to region C/D may be yielded (or obtained).

Referring to FIG. 5, M/H block 2 (B2) and M/H block 9 (B9) correspond to a region having more interference from the main service data as compared to region B. A long known data sequence cannot be inserted in any side of M/H block 2 (B2) and M/H block 9 (B9). Herein, the region including M/H block 2 (B2) and M/H block 9 (B9) will be referred to as "region C (=B2+B9)". Finally, in the example shown in FIG. 5, M/H block 1 (B1) and M/H block 10 (B10) correspond to a region having more interference from the main service data as compared to region C. Similarly, a long known data sequence cannot be inserted in any side of M/H block 1 (B1) and M/H block 10 (B10). Herein, the region including M/H block 1 (B1) and M/H block 10 (B10) will be referred to as "region D (=B1+B10)". Since region C/D is spaced further apart from the known data sequence, when the channel environment undergoes frequent and abrupt changes, the receiving performance of region C/D may be deteriorated.

Additionally, the data group includes a signaling information area wherein signaling information is assigned (or allocated). In the present invention, the signaling information area may start from the $1^{st}$ segment of the $4^{th}$ M/H block (B4) to a portion of the $2^{nd}$ segment. According to an embodiment of the present invention, the signaling information area for inserting signaling information may start from the $1^{st}$ segment of the $4^{th}$ M/H block (B4) to a portion of the $2^{nd}$ segment. More specifically, 276(=207+69) bytes of the $4^{th}$ M/H block (B4) in each data group are assigned as the signaling information area. In other words, the signaling information area consists of 207 bytes of the $1^{st}$ segment and the first 69 bytes of the $2^{nd}$ segment of the $4^{th}$ M/H block (B4). The $1^{st}$ segment of the $4^{th}$ M/H block (B4) corresponds to the $17^{th}$ or $173^{rd}$ segment of a VSB field.

Herein, the signaling data transmitted through the signaling information area may be identified by two different types of channel data: a transmission parameter channel (TPC) data and a fast information channel (FIC) data.

Also, the TPC data includes parameters that are mostly used in a physical layer module. And, since the TPC data are transmitted without being interleaved, the TPC data may be accessed by slot unit in the receiving system. The FIC data are provided in order to enable the receiving system to perform fast service acquisition. Herein, the FIC data include cross layer information between a physical layer and an upper layer. The FIC data are interleaved in sub-frame units and then transmitted.

For example, when the data group includes 6 known data sequences, as shown in FIG. 5, the signaling information area is located between the first known data sequence and the second known data sequence. More specifically, the first known data sequence is inserted in the last 2 segments of the $3^{rd}$ M/H block (B3), and the second known data sequence in inserted in the $2^{nd}$ and $3^{rd}$ segments of the $4^{th}$ M/H block (B4). Furthermore, the $3^{rd}$ to $6^{th}$ known data sequences are respectively inserted in the last 2 segments of each of the $4^{th}$, $5^{th}$, $6^{th}$, and $7^{th}$ M/H blocks (B4, B5, B6, and B7). The $1^{st}$ and $3^{rd}$ to $6^{th}$ known data sequences are spaced apart by 16 segments.

Figure 6:
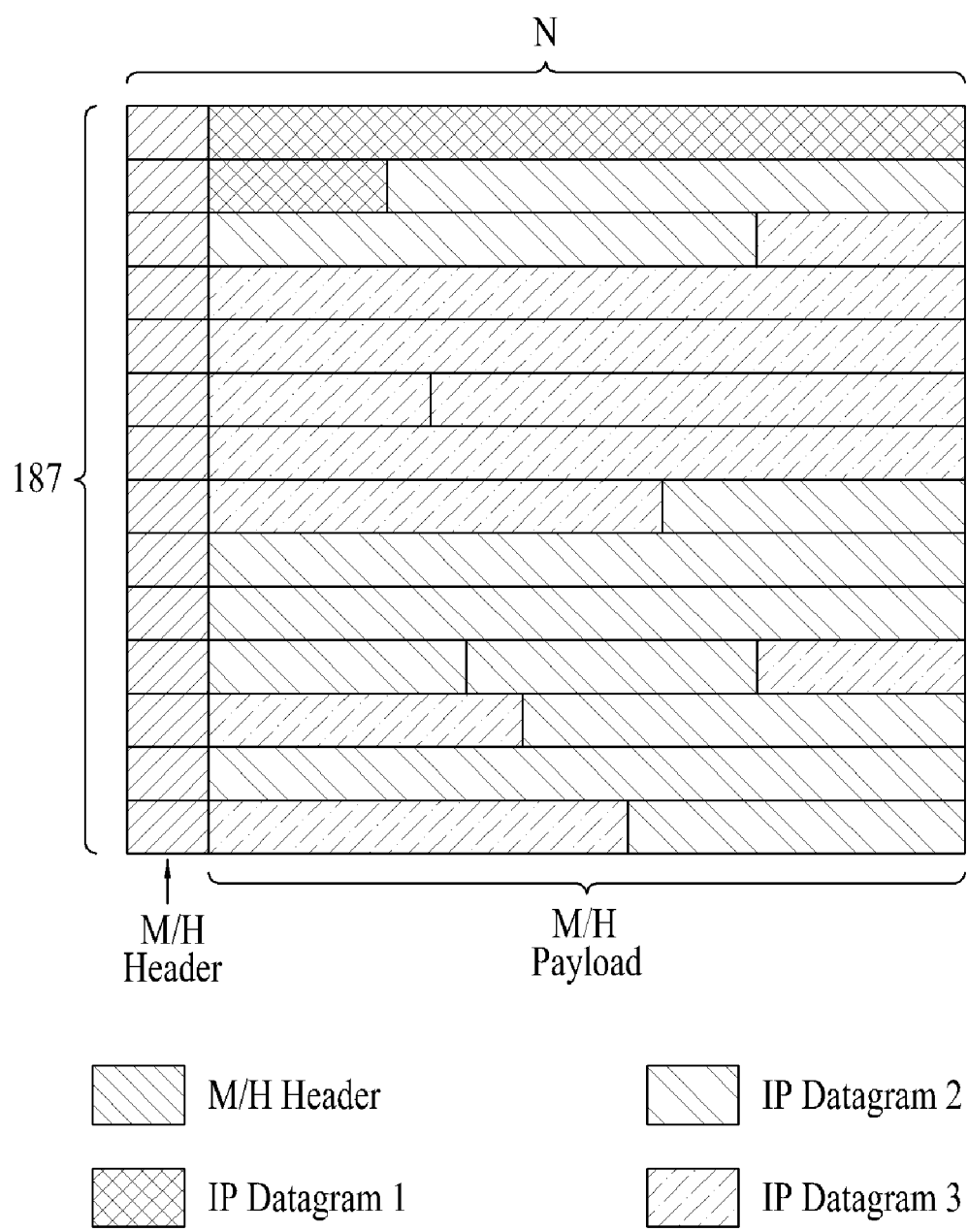
FIG. 6 illustrates an RS frame according to an embodiment of the present invention.

FIG. 6 illustrates an RS frame according to an embodiment of the present invention.

The RS frame is received for each M/H frame in a condition where the receiving system is switched to a time-slicing mode.

The RS frame according to an embodiment of the present invention is configured of multiple M/H transport packets (TPs). Each M/H TP consists of a 2-byte M/H header and a (N−2)-byte M/H payload.

At this point, one M/H TP including an M/H header can not reach N bytes. In this case, stuffing bytes can be allocated to the other payload part of the corresponding M/H TP. For example, after the service signaling channel is allocated to one M/H TP, the length of the M/H TP including the M/H header is N−20 bytes, stuffing bytes can be allocated to the other 20 bytes.

Figure 7:
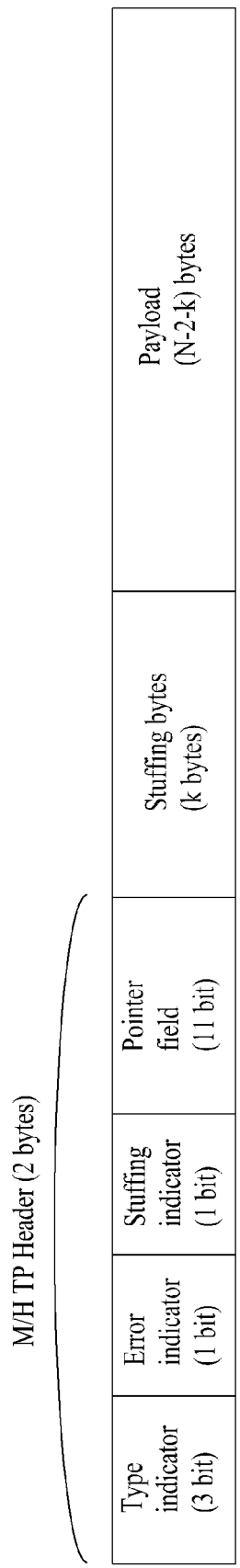
FIG. 7 illustrates a header structure of each M/H transport packet within the RS frame.

FIG. 7 is a diagram illustrating examples of fields allocated to the M/H header region within the M/H TP according to the present invention. Examples of the fields include type_indicator field, error_indicator field, stuff_indicator field, and pointer field.

The type_indicator field can allocate 3 bits, for example, and represents a type of data allocated to payload within the corresponding M/H TP.

The error_indicator field can allocate 1 bit, for example, and represents whether the corresponding M/H TP has an error. For example, if the error_indicator field has a value of 0, it means that there is no error in the corresponding M/H TP. If the error_indicator field has a value of 1, it means that there may be an error in the corresponding M/H TP.

The stuff_indicator field can allocate 1 bit, for example, and represents whether stuffing byte exists in payload of the corresponding M/H TP. For example, if the stuff_indicator field has a value of 0, it means that there is no stuffing byte in the corresponding M/H TP. If the stuff_indicator field has a value of 1, it means that stuffing byte exists in the corresponding M/H TP.

The pointer field can allocate 11 bits, for example, and represents position information where new data (i.e., new IP datagram) starts in the corresponding M/H TP. For example, if IP datagram for mobile service 1 and IP datagram for mobile service 2 are allocated to the first M/H TP within the RS frame, the pointer field value represents the start position of the IP datagram for mobile service 2 within the M/H TP. Also, if there is no new data in the corresponding M/H TP, the corresponding field value is expressed as a maximum value exemplarily. According to the embodiment of the present invention, since 11 bits are allocated to the pointer field, if 2047 is expressed as the pointer field value, it means that there is no new data in the packet. The point where the pointer field value is 0 can be varied depending on the type_indicator field value and the stuff_indicator field value.

It is to be understood that the order, the position, and the meaning of the fields allocated to the M/H header within the M/H TP illustrated in FIG. 7 are exemplarily illustrated for understanding of the present invention. Since the order, the position and the meaning of the fields allocated to the M/H header within the M/H TP and the number of additionally allocated fields can easily be modified by those skilled in the art, the present invention will not be limited to the above example.

The M/H payload of the M/H TP may include at least one of an IP datagram of mobile service data and an IP datagram of a service signaling channel.

More specifically, one RS frame includes an IP datagram of each mobile service data set. Also, an IP datagram of a service signaling channel is included in each of the RS frames. According to an embodiment of the present invention, the IP datagram of the service signaling channel comprises a well-known IP destination address and a well-known destination UDP port number. And, the IP datagram is included in the RS frame so as to be received.

An IP datagram of the service signaling channel includes at least one or more signaling tables. As shown in FIG. 4, the IP datagram of the service signaling channel may also include at least one of the SMT, GAT, CIT, SLT, and RRT. At this point, the IP datagrams of the service signaling channel have the same well-known IP address and the same well-known UDP port number.

The RS frame of FIG. 6 includes 3 different types of IP datagram (i.e., IP datagram 1, IP datagram 2, and IP datagram 3). And, herein, one of the IP datagrams corresponds to an IP datagram for the service signaling channel. Each of the remaining IP datagrams may correspond to an IP datagram of the mobile service data or to an IP datagram of the service guide.

In the transmitting system, RS-encoding is performed on the RS frame in a column direction, and CRC-encoding is performed on the RS frame in a row direction. Then, the processed RS frame is allocated to the corresponding regions within multiple data groups, thereby being transmitted. In the description of the present invention, all of the data included in the RS frame will be referred to as mobile service data for simplicity.

Data Transmission Structure

Figure 8:
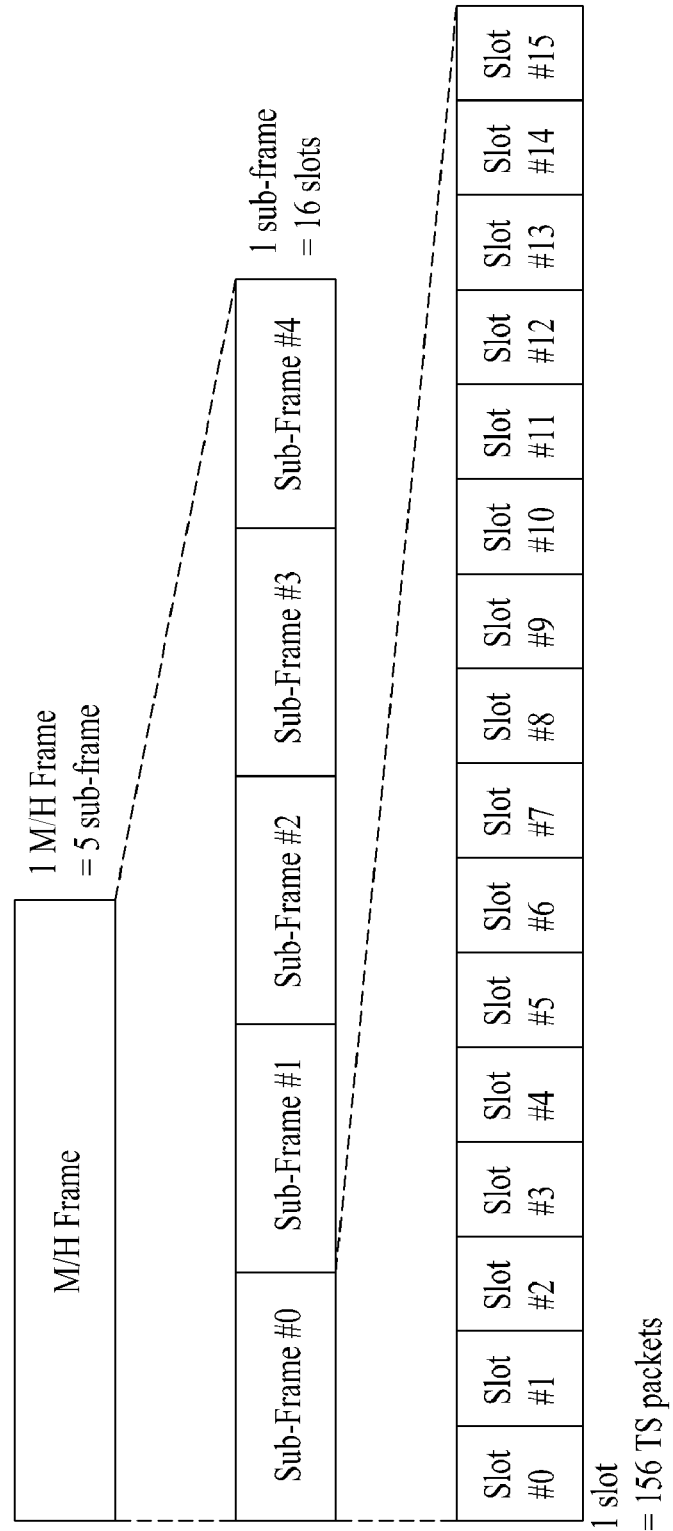
FIG. 8 illustrates an exemplary M/H frame structure for receiving and transmitting mobile service data according to the present invention.

FIG. 8 illustrates a structure of an M/H frame for transmitting and receiving mobile service data according to the present invention. In the example shown in FIG. 8, one M/H frame consists of 5 sub-frames, wherein each sub-frame includes 16 slots. In this case, the M/H frame according to the present invention includes 5 sub-frames and 80 slots. Also, in a packet level, one slot is configured of 156 data packets (i.e., transport stream packets), and in a symbol level, one slot is configured of 156 data segments. Herein, the size of one slot corresponds to one half (½) of a VSB field. More specifically, since one 207-byte data packet has the same amount of data as a data segment, a data packet prior to being interleaved may also be used as a data segment. At this point, two VSB fields are grouped to form a VSB frame.

One VSB frame consists of 2 VSB fields (i.e., an odd field and an even field). Herein, each VSB field includes a field synchronization segment and 312 data segments. The slot corresponds to a basic time unit for multiplexing the mobile service data and the main service data.

Herein, one slot may either include the mobile service data or be configured only of the main service data. If the first 118 data packets within the slot correspond to a data group, the remaining 38 data packets become the main service data packets. In another example, when no data group exists in a slot, the corresponding slot is configured of 156 main service data packets.

Meanwhile, the data within one RS frame may be assigned either to all of regions A/B/C/D within the corresponding data group, or to at least one of regions A/B/C/D. In the embodiment of the present invention, the data within one RS frame may be assigned either to all of regions A/B/C/D, or to at least one of regions A/B and regions C/D. If the mobile service data are assigned to the latter case (i.e., one of regions A/B and regions C/D), the RS frame being assigned to regions A/B and the RS frame being assigned to regions C/D within the corresponding data group are different from one another.

According to the embodiment of the present invention, the RS frame being assigned to regions A/B within the corresponding data group will be referred to as a "primary RS frame", and the RS frame being assigned to regions C/D within the corresponding data group will be referred to as a "secondary RS frame", for simplicity. Also, the primary RS frame and the secondary RS frame form (or configure) one parade. More specifically, when the data within one RS frame are assigned either to all of regions A/B/C/D within the corresponding data group, one parade transmits one RS frame. Conversely, when the data within one RS frame are assigned either to at least one of regions A/B and regions C/D, one parade may transmit up to 2 RS frames. More specifically, the RS frame mode indicates whether a parade transmits one RS frame, or whether the parade transmits two RS frames. Such RS frame mode is transmitted as the TPC data. Table 1 below shows an example of the RS frame mode.

TABLE 1

| RS frame mode (2 bits) | Description |
|---|---|
| 00 | There is only one primary RS frame for all group regions |
| 01 | There are two separate RS frames. Primary RS frame for group regions A and B Secondary RS frame for group regions C and D |
| 10 | Reserved |
| 11 | Reserved |

Table 1 illustrates an example of allocating 2 bits in order to indicate the RS frame mode. For example, referring to Table 1, when the RS frame mode value is equal to '00', this indicates that one parade transmits one RS frame. And, when the RS frame mode value is equal to '01', this indicates that one parade transmits two RS frames, i.e., the primary RS frame and the secondary RS frame. More specifically, when the RS frame mode value is equal to '01', data of the primary RS frame for regions A/B are assigned and transmitted to regions A/B of the corresponding data group. Similarly, data of the secondary RS frame for regions C/D are assigned and transmitted to regions C/D of the corresponding data group.

As described in the assignment of data groups, the parades are also assigned to be spaced as far apart from one another as possible within the sub-frame. Thus, the system can be capable of responding promptly and effectively to any burst error that may occur within a sub-frame.

Furthermore, the method of assigning parades may be identically applied to all M/H frames or differently applied to each M/H frame. According to the embodiment of the present invention, the parades may be assigned differently for each M/H frame and identically for all sub-frames within an M/H frame. More specifically, the M/H frame structure may vary by M/H frame units. Thus, an ensemble rate may be adjusted on a more frequent and flexible basis.

That is, the concept of an M/H ensemble is applied in the embodiment of the present invention, thereby defining a collection (or group) of services. Each M/H ensemble carries the same QoS and is coded with the same FEC code. Also, each M/H ensemble has the same unique identifier (i.e., ensemble ID) and corresponds to consecutive RS frames. Furthermore, an ensemble has a unique identifier (i.e., ensemble id), and the ensemble corresponds to a collection of consecutive RS frames with the same FEC codes. At this point, each RS frame is encapsulated to transport packets including IP streams. In other words, the RS frame corresponds to a two-dimensional data frame through which an ensemble is RS-CRC encoded.

Figure 9:
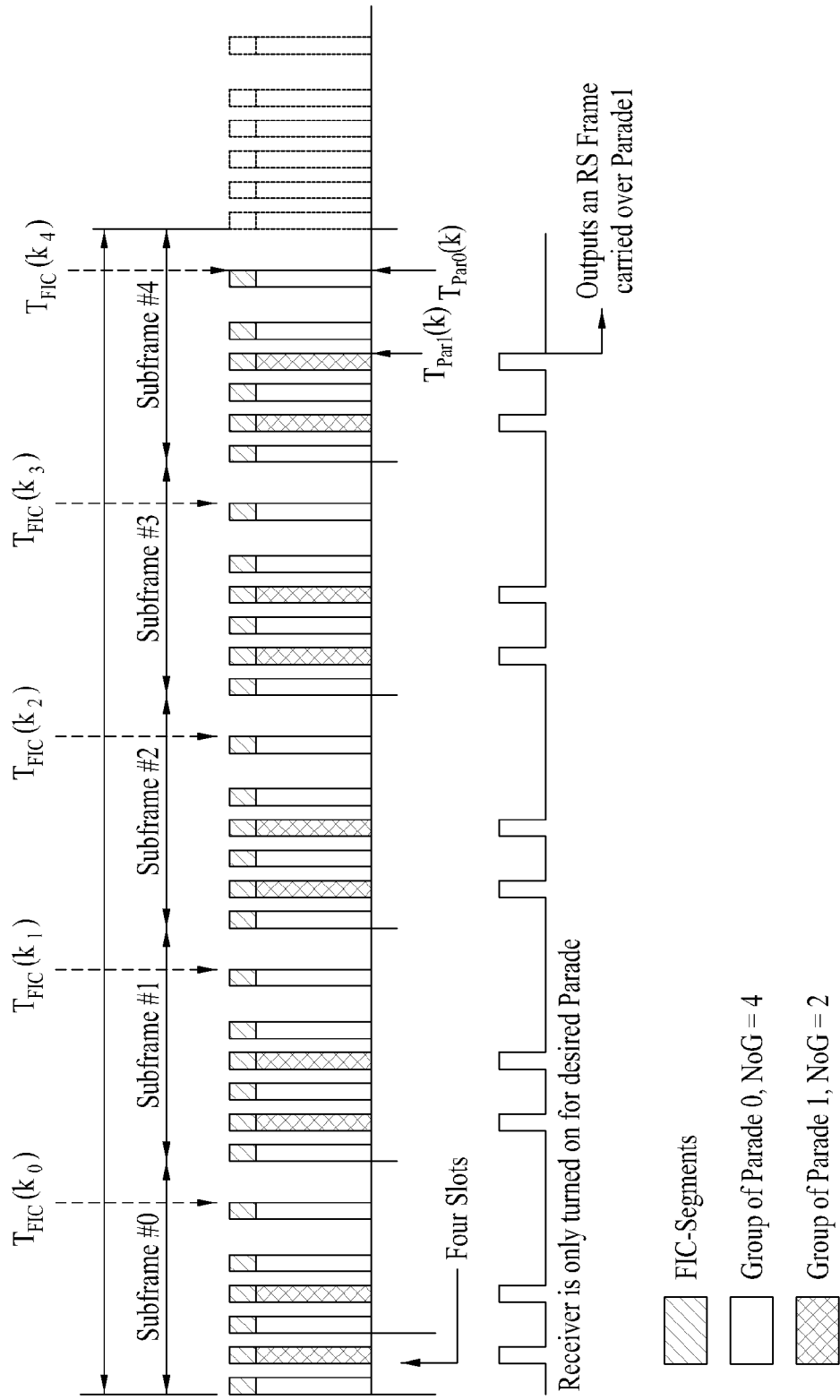
FIG. 9 illustrates a data transmission structure for mobile services according to an embodiment of the present invention.

FIG. 9 illustrates a data transmission structure in a physical layer according to an embodiment of the present invention. More specifically, FIG. 9 shows an example of FIC data being included in each data group and transmitted. As described above, an M/H frame for approximately 0.968 seconds is divided into 5 sub-frames, wherein data groups corresponding to multiple ensembles exist in combination within each sub-frame. Also, the data groups corresponding to each ensemble are interleaved in M/H frame units, so as to configure an RS frame belonging to one ensemble. In FIG. 9, 2 ensembles (wherein NoG=4 and NoG=3) exist in each sub-frame. Furthermore, a predetermined portion (e.g., 37 bytes/data group) of each data group is used for the purpose of separately delivering encoded FIC data apart from the RS frame data channel. The FIC region assigned to each data group consists of one FIC segment. Herein, each of the FIC segments is interleaved in sub-frame units. For example, RS-encoding and SCCC encoding processes are applied to the RS frame data, and RS encoding and PCCC encoding processes are applied to the FIC data. Also, as well as the FIC data, the RS encoding and PCCC encoding processes are applied to the TPC data. More specifically, (187+P,187)-RS encoding process is applied to the RS frame data, (51,37)-RS encoding process is applied to the FIC data, and (18,10)-RS encoding process is applied to the TPC. Herein, P is the number of parity bytes.

Hierarchical Signaling Structure

Figure 10:
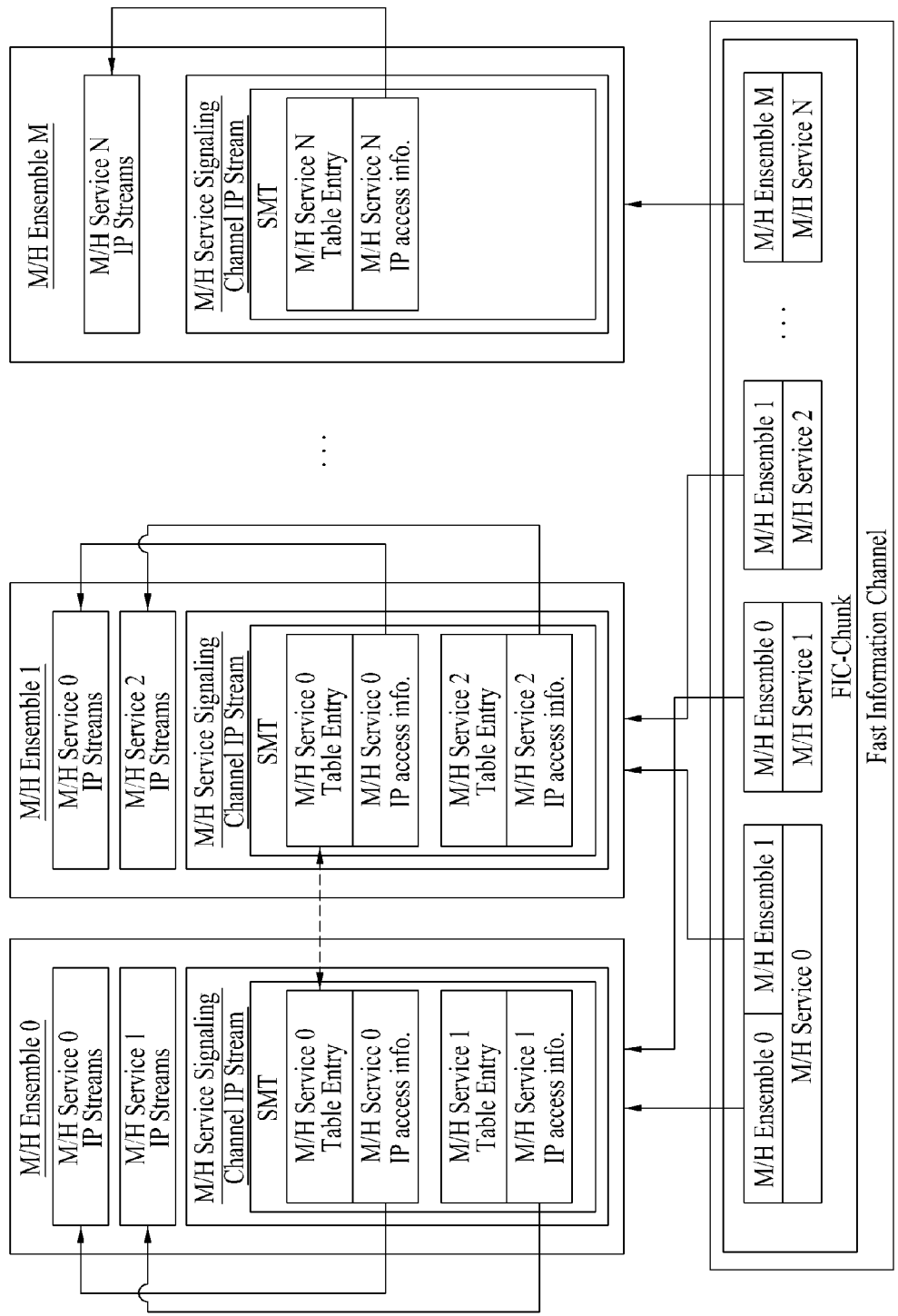
FIG. 10 illustrates a hierarchical signaling structure according to an embodiment of the present invention.

FIG. 10 illustrates a hierarchical signaling structure according to an embodiment of the present invention. As shown in FIG. 10, the mobile broadcasting technology according to the embodiment of the present invention adopts a signaling method using FIC and SMT (Service Map Table). In the description of the present invention, the signaling structure will be referred to as a hierarchical signaling structure.

More specifically, FIG. 10 illustrates a hierarchical signaling structure that provides data required for service acquisition through an FIC chunk and a service map table (SMT), among IP-level mobile service signaling channels.

As shown in FIG. 10, the FIC chunk uses its fast characteristic, so as to deliver a mapping relation between a service and an ensemble to the receiving system. More specifically, the FIC chunk quickly locates (or finds) an ensemble that can deliver a service requested by the receiving system, thereby providing the receiving system with signaling data that can enable the receiving system to swiftly receive RS frames of a respective ensemble.

Fast Information Channel (FIC)

The receiving system according to the present invention adopts the fast information channel (FIC) for a faster (or swifter) access to a service that is currently being broadcasted.

FIG. 11 illustrates a syntax structure of an FIC chunk that maps the relation between a mobile service and an ensemble through the FIC.

Herein, the FIC chunk consists of a 5-byte FIC chunk header and an FIC chunk payload having variable-length.

FIG. 12 illustrates a syntax structure of an FIC chunk header according to an embodiment of the present invention.

Herein, the FIC chunk header signals a non-backward compatible major protocol version change in a corresponding FIC chunk and also signals a backward compatible minor protocol version change. Furthermore, the FIC chunk header also signals the length for an extension of an FIC chunk header, the length for an extension of an ensemble loop header, and the length for an extension of a mobile service loop that can be generated by a minor protocol version change.

According to an embodiment of the present invention, a receiver (or receiving system) that can adopt the corresponding minor protocol version change may process the corresponding extension field, whereas a legacy (or conventional) receiver that cannot adopt the corresponding minor protocol version change may skip the corresponding extension field by using each of the corresponding length information. For example, in case of a receiving system that can accept the corresponding minor protocol version change, the directions given in the corresponding extension field may be known. Furthermore, the receiving system may perform operations in accordance with the directions given in the corresponding extension field.

According to an embodiment of the present invention, a minor protocol version change in the FIC chunk is performed by inserting additional fields at the respective end portion of the FIC chunk header, the ensemble loop header, and the mobile service loop included in the previous minor protocol version FIC chunk. According to an embodiment of the present invention, in any other case, or when the length of the additional fields cannot be expressed (or indicated) by each extension length within the FIC chunk header, or when a specific field within the FIC chunk payload is missing (or cannot be found), or when the number of bits being assigned to the corresponding field or the definition of the corresponding field is changed (or altered), the major protocol version of the corresponding FIC chunk is updated.

Also, the FIC chunk header signals whether the data of a corresponding FIC chink payload carry mapping information between an ensemble and a mobile service within the current M/H frame, or whether the data of a corresponding FIC chink payload carry mapping information between an ensemble and a mobile service within the next M/H frame. Furthermore, the FIC chunk header also signals the number of transport stream IDs of a mobile service through which the current FIC chunk is being transmitted and the number of ensembles being transmitted through the corresponding mobile service.

Accordingly, for this, the FIC chunk header may include an FIC_major_protocol_version field, an FIC_minor_protocol_version field, an FIC_chunk_header_extension_length field, an ensemble_loop_header_extension_length field, an M/H_service_loop_extension_length field, a current_next_indicator field, a transport_stream_id field, and a num_ensembles field.

The FIC_major_protocol_version field corresponds to a 2-bit unsigned integer field that represents the major version level of an FIC chunk syntax. A change in the major version level shall indicate a change in a non-backward-compatible level. When the FIC_major_protocol_version field is updated, legacy (or conventional) receivers, which can process the prior major protocol version of an FIC chunk protocol, shall avoid processing the FIC chunk.

The FIC_minor_protocol_version field corresponds to a 3-bit unsigned integer field that represents the minor version level of an FIC chunk syntax. When it is assumed that the major version level remains the same, a change in the minor version level shall indicate a change in a backward-compatible level. More specifically, when the FIC_minor_protocol_version field is updated, legacy (or conventional) receivers, which can process the same major version of the FIC chunk protocol, may process a portion of the FIC chunk.

The FIC_Chunk_header_extension_length field corresponds to a 3-bit unsigned integer field identifying the length of FIC chunk header extension bytes, which are generated by the minor protocol version update of the corresponding FIC chunk. Herein, the extension bytes are appended (or added) at the end of the corresponding FIC chunk header.

The ensemble_header_extension_length field corresponds to a 3-bit unsigned integer field identifying the length of the ensemble header extension bytes, which are generated by the minor protocol version update of the corresponding FIC chunk. Herein, the extension bytes are appended (or added) at the end of the corresponding ensemble loop header.

Also, the M/H_service_loop_extension_length field corresponds to a 4-bit unsigned integer field identifying the length of the ensemble header extension bytes, which are generated by the minor protocol version update of the M/H service loop. Herein, the extension bytes are appended (or added) at the end of the corresponding M/H service loop.

For example, it is assumed that the FIC chunk includes 2 ensembles (i.e., ensemble 0 and ensemble 1). More specifically, it is assumed that two mobile services are transmitted through ensemble 0, and one mobile service is transmitted through ensemble 1. At this point, when the minor protocol version of the FIC chunk is changed, and the FIC chunk header is expanded by 1 byte, the FIC_chunk_header_extension_length field is marked as '001'. In this case, a 1-byte expansion field (i.e., FIC_Chunk_header_extension_bytes field) is added at the end of the FIC chunk header. Also, the legacy receiver skips the 1-byte expansion field, which is added at the end of the FIC chunk header, without processing the corresponding expansion field.

Additionally, when the ensemble loop header within the FIC chunk is expanded by 2 bytes, the ensemble_loop_header_extension_length field is marked as '010'. In this case, a 2-byte expansion field (i.e., Ensemble_loop_header_extension_bytes field) is respectively added at the end of the ensemble 0 loop header and at the end of the ensemble 1 loop header. Also, the legacy receiver skips the 2-byte expansion fields, which are respectively added at the end of the ensemble 0 loop header and at the end of the ensemble 1 loop header, without processing the corresponding 2-byte expansion fields.

Furthermore, when the mobile service loop of the FIC chunk is expanded by 1 byte, the M/H_service_loop_extension_length field is marked as '001'. In this case, a 1-byte expansion field (i.e., M/H_service_loop_extension_bytes field) is respectively added at the end of 2 mobile service loops being transmitted through ensemble 0 loop and at the end of 1 mobile service loop being transmitted through the ensemble 1 loop. And, the legacy receiver skips the 1-byte expansion fields, which are respectively added at the end of 2 mobile service loops being transmitted through ensemble 0 loop and at the end of 1 mobile service loop being transmitted through the ensemble 1 loop, without processing the corresponding 1-byte expansion fields.

As described above, when the FIC_minor_protocol version field is changed, a legacy (or conventional) receiver (i.e., a receiver that cannot adopt the minor protocol version change in the corresponding FIC chunk) processes the fields apart from the extension field. Thereafter, the legacy receiver uses the FIC_chunk_header_extension_length field, the ensemble_loop_header_extension_length field, and the M/H_service_loop_extension_length field, so as to skip the corresponding expansion fields without processing the corresponding fields. When using a receiving system that can adopt the corresponding minor protocol version change of the FIC chunk, each length field is used to process even the corresponding expansion field.

The current_next_indicator field corresponds to a 1-bit indicator, which, when set to '1', indicates that the corresponding FIC chunk is currently applicable. Alternatively, when the current_next_indicator field is set to '0', the current_next_indicator field indicates that the corresponding FIC chunk will be applicable for the next M/H frame. Herein, when the current_next_indicator field is set to '0', the most recent version of the FIC chunk being transmitted with the current_next_indicator field set to '1' shall be currently applicable. More specifically, when the current_next_indicator field value is set to '1', this indicates that the corresponding FIC chunk transmits the signaling data of the current M/H frame. Further, when the current_next_indicator field value is set to '0', this indicates that the corresponding FIC chunk transmits the signaling data of the next M/H frame. When reconfiguration occurs, wherein the mapping information between the ensemble within the current M/H frame and the mobile service differs from the ensemble within the next M/H frame and the mobile service, the M/H frame prior to reconfiguration is referred to as the current M/H frame, and the M/H frame following reconfiguration is referred to as the next M/H frame.

The transport_stream_id field corresponds to a 16-bit unsigned integer number field, which serves as a label for identifying the corresponding M/H broadcast. The value of the corresponding transport_stream_id field shall be equal to the value of the transport_stream_id field included in the program association table (PAT) within the MPEG-2 transport stream of a main ATSC broadcast.

The num_ensembles field corresponds to an 8-bit unsigned integer field, which indicates the number of M/H ensembles carried through the corresponding physical transmission channel.

FIG. 13 illustrates an exemplary syntax structure of an FIC chunk payload according to an embodiment of the present invention. For each ensemble corresponding to the num_ensembles field value within the FIC chunk header of FIG. 12, the FIC chunk payload includes configuration information of each ensemble and information on mobile services being transmitted through each ensemble.

The FIC chunk payload consists of an ensemble loop and a mobile service loop below the ensemble loop. The FIC chunk payload enables the receiver to determine through which ensemble a requested (or desired) mobile service is being transmitted. (This process is performed via mapping between the ensemble_id field and the M/H_service_id field.) Thus, the receiver may receive RS frames belonging to the corresponding ensemble.

In order to do so, the ensemble loop of the FIC chunk payload may include an ensemble_id field, an ensemble_protocol_version field, an SLT_ensemble_indicator field, a GAT_ensemble_indicator field, an MH_service_signaling_channel_version field, and a num_M/H_services field, which are collectively repeated as many times as the num_ensembles field value. The mobile service loop may include an MH_service_id field, a multi_ensemble_service field, an MH_service_status field, and an SP_indicator field, which are collectively repeated as many times as the num_M/H_services field.

The ensemble_id field corresponds to an 8-bit unsigned integer field, which indicates a unique identifier of the corresponding ensemble. For example, the ensemble_id field may be assigned with values within the range '0x00' to '0x7F'. The ensemble_id field group (or associate) the mobile services with the respective ensemble. Herein, it is preferable that the value of the ensemble_id field is derived from the parade_id field carried (or transmitted) through the TPC data. If the corresponding ensemble is transmitted through a primary RS frame, the most significant bit is set to '0', and the remaining least significant bits are used as the parade_id field value of the corresponding parade. Meanwhile, if the corresponding ensemble is transmitted through a secondary RS frame, the most significant bit is set to '0', and the remaining least significant bits are used as the parade_id field value of the corresponding parade.

The ensemble_protocol_version field corresponds to a 5-bit field, which specifies a version of the corresponding ensemble structure.

The SLT_ensemble_indicator field is a 1-bit field, which indicates whether or not the SLT is being transmitted to the service signaling channel of the corresponding ensemble. For example, when the SLT_ensemble_indicator field value is equal to '1', this may indicate that the SLT is being transmitted to the service signaling channel. On the other hand, when the SLT_ensemble_indicator field value is equal to '0', this may indicate that the SLT is not being transmitted.

The GAT_ensemble_indicator field is also a 1-bit field, which indicates whether or not the GAT is being transmitted to the service signaling channel of the corresponding ensemble. For example, when the GAT_ensemble_indicator field value is equal to '1', this may indicate that the GAT is being transmitted to the service signaling channel. On the other hand, when the GAT_ensemble_indicator field value is equal to '0', this may indicate that the GAT is not being transmitted.

The MH_service_signaling_channel_version field corresponds to a 5-bit field, which indicates a version number of the service signaling channel of the corresponding ensemble.

The num_M/H_services field corresponds to an 8-bit unsigned integer field, which represents the number of mobile (i.e., M/H) services carried through the corresponding M/H ensemble.

For example, when the minor protocol version within the FIC chunk header is changed, and when an extension field is added to the ensemble loop header, the corresponding extension field is added immediately after the num_M/H_services field. According to anther embodiment of the present invention, if the num_M/H_services field is included in the mobile service loop, the corresponding extension field that is to be added in the ensemble loop header is added immediately after the M/H_service_configuration_version field.

The M/H_service_id field of the mobile service loop corresponds to a 16-bit unsigned integer number, which identifies the corresponding M/H service. The value (or number) of the M/H_service_id field shall be unique within the mobile (M/H) broadcast. When an M/H service has components in multiple M/H ensembles, the set of IP streams corresponding to the service in each ensemble shall be treated as a separate service for signaling purposes, with the exception that the entries for the corresponding services in the FIC shall all have the same M/H_service_id field value. Thus, the same M/H_service_id field value may appear in more than one num_ensembles loop. And, accordingly, the M/H_service_id field shall represent the overall combined service, thereby maintaining the uniqueness of the M/H_service_id field value.

The multi_ensemble_service field is a 2-bit enumerated field, which indicates whether the corresponding mobile (M/H) service is transmitted through (or over) one ensemble, or whether the corresponding mobile (M/H) service is transmitted through (or over) multiple ensembles. Also, the value of the multi_ensemble_service field indicates whether or not the mobile service is valid (or rendered meaningfully) only for the mobile service portion being transmitted through (or over) the corresponding ensemble.

The M/H_service_status field corresponds to a 2-bit enumerated field, which identifies the status of the corresponding M/H service. For example, the most significant bit of the M/H_service_status field indicates whether the corresponding M/H service is active (when set to '1') or inactive (when set to '0'). Furthermore, the least significant bit indicates whether the corresponding M/H service is hidden (when set to '1') or not (when set to '0').

The SP_indicator field corresponds to a 1-bit field, which, when set to '1', indicates whether or not service protection is applied to at least one of the components required for providing a significant presentation of the corresponding M/H service.

For example, when the minor protocol version of the FIC chunk is change, and if an expansion field is added to the mobile service loop, the expansion field is added after the SP_indicator field.

Also, the FIC chunk payload may include an FIC_chunk_stuffing( ) field. Stuffing of the FIC_chunk_stuffing( ) field may exist in an FIC-Chunk, to keep the boundary of the FIC-Chunk to be aligned with the boundary of the last FIC-Segment among FIC segments belonging to the FIC chunk. The length of the stuffing is determined by how much space is left after parsing through the entire FIC-Chunk payload preceding the stuffing.

At this point, the transmitting system (not shown) according to the present invention divides the FIC chunk into multiple FIC segments, thereby outputting the divided FIC segments to the receiving system in FIC segment units. The size of each FIC segment unit is 37 bytes, and each FIC segment consists of a 2-byte FIC segment header and a 35-byte FIC segment payload. More specifically, an FIC chunk, which is configured of an FIC chunk header and an FIC chunk payload, is segmented by units of 35 bytes. Also, an FIC segment is configured by adding a 2-byte FIC segment header in front of each segmented 35-byte unit.

According to an embodiment of the present invention, the length of the FIC chunk payload is variable. Herein, the length of the FIC chunk varies depending upon the number of ensembles being transmitted through the corresponding physical transmission channel and the number of mobile services included in each ensemble.

Also, the FIC chunk payload may include stuffing data. In this case, the stuffing data are used for the boundary alignment of the FIC chunk and the last FIC-Segment, among FIC segments belonging to the FIC chunk, according to the embodiment of the present invention. Accordingly, by minimizing the length of the stuffing data, unnecessary wasting of FIC segments can be reduced.

At this point, the number of stuffing data bytes being inserted in the FIC chunk can be calculated by using Equation 1 below.

The number of stuffing data bytes=$35-j$ $j=(5+\text{the number of signaling data bytes being inserted in the FIC chunk payload}) \bmod 35$  Equation 1

For example, when the added total length of the 5-byte header within the FIC chunk and signaling data, which is to be inserted in the payload within the FIC chunk, is equal to 205 bytes, the payload of the FIC chunk may include 5 bytes of stuffing data because j is equal to 30 in Equation 1. Also, the length of the FIC chunk payload including the stuffing data is equal to 210 bytes. Thereafter, the FIC chunk is divided into 6 FIC segments, which are then transmitted. At this point, a segment number is sequentially assigned to each of the 6 FIC segments divided from the FIC chunk.

Furthermore, the present invention may transmit the FIC segments divided from a single FIC chunk to a single sub-frame, or may transmit the divided FIC segments to multiple sub-frames. If the FIC chunk is divided and transmitted to multiple sub-frames, signaling data, which are required even when the amount of data that are to be transmitted through the FIC chunk is larger than the amount of FIC segments being transmitted through a single sub-frame (this case corresponds to when multiple services having very low bit rates are being executed), may all be transmitted through the FIC chunk.

Herein, the FIC segment numbers represent FIC segment numbers within each FIC chunk, and not the FIC segment number within each sub-frame. Thus, the subordinate relation between the FIC chunk and the sub-frame can be eliminated, thereby reducing excessive waste of FIC segments.

Furthermore, the present invention may add a null FIC segment. Despite the repeated transmission of the FIC chunk, and when stuffing is required in the corresponding M/H frame, the null FIC segment is used for the purpose of processing the remaining FIC segments. For example, it is assumed that TNoG is equal to '3' and that the FIC chunk is divided into 2 FIC segments. Herein, when the FIC chunk is repeatedly transmitted through 5 sub-frames within a single M/H frame, only 2 FIC segments are transmitted through one of the 5 sub-frames (e.g., the sub-frame chronologically placed in the last order). In this case, one null FIC segment is assigned to the corresponding sub-frame, thereby being transmitted. More specifically, the null FIC segment is used for aligning the boundary of the FIC chunk and the boundary of the M/H frame. At this point, since the null FIC segment is not an FIC segment divided from the FIC chunk, an FIC segment number is not assigned to the null FIC segment.

In the present invention, when a single FIC chunk is divided into a plurality of FIC segments, and when the divided FIC segments are included in each data group of at least one sub-frame within the M/H frame, so as to be transmitted, the corresponding FIC segments are allocated in a reversed order starting from the last sub-frame within the corresponding M/H frame. According to an embodiment of the present invention, in case a null FIC segment exists, the null FIC segment is positioned in the sub-frame within the M/H frame, so that the corresponding null FIC segment can be transmitted as the last (or final) segment.

At this point, in order to enable the receiving system to discard the null FIC segment without having to process the corresponding null FIC segment, identification information that can identify (or distinguish) the null FIC segment is required.

According to an embodiment of the present invention, the present invention uses the FIC_segment_type field within the header of the null FIC segment as the identification information for identifying the null FIC segment. In this embodiment, the value of the FIC_segment_type field within the null FIC segment header is set to '11', so as to identify the corresponding null FIC segment. More specifically, when the FIC_segment_type field value within the null FIC segment header is set to '11' and transmitted to the receiving system, the receiving system may discard the payload of the FIC segment having the FIC_segment_type field value set to '11' without having to process the corresponding FIC segment payload. Herein, the value '11' is merely an exemplary value given to facilitate and simplify the understanding of the present invention. As long as a pre-arrangement between the receiving system and the transmitting system is established, any value that can identify the null FIC segment may be given to the FIC_segment_type field. Therefore, the present invention will not be limited only to the example set presented herein. Furthermore, the identification information that can identify the null FIC segment may also be indicated by using another field within the FIC segment header.

FIG. 14 illustrates an exemplary syntax structure of an FIC segment header according to an embodiment of the present invention.

Herein, the FIC segment header may include an FIC_segment_type field, an FIC_chunk_major_protocol_version field, a current_next_indicator field, an error_indicator field, an FIC_segment_num field, and an FIC_last_segment_num field. Each field will now be described as follows.

The FIC_segment_type field corresponds to a 2-bit field, which, when set to '00' indicates that the corresponding FIC segment is carrying a portion of an FIC chunk. Alternatively, when the FIC_segment_type field is set to '11', the FIC_segment_type field indicates that the corresponding FIC segment is a null FIC segment, which transmits stuffing data. Herein, the remaining values are reserved for future use.

The FIC_Chunk_major_protocol_version field corresponds to a 2-bit field, which indicates a major protocol version of the corresponding FIC chunk. At this point, the value of the FIC_Chunk_major_protocol_version field should be the same as the value of the FIC_major_protocol_version field within the corresponding FIC chunk header. Since reference may be made to the description of the FIC chunk header shown in FIG. 12, a detailed description of the major protocol version of the FIC chunk syntax will be omitted for simplicity.

The current_next_indicator field corresponds to a 1-bit indicator, which, when set to '1', shall indicate that the corresponding FIC segment is carrying a portion of the FIC chunk, which is applicable to the current M/H frame. Alternatively, when the value of the current_next_indicator field is set to '0', the current_next_indicator field shall indicate that the corresponding FIC segment is carrying a portion of the FIC chunk, which will be applicable for the next M/H frame.

The error_indicator field corresponds to a 1-bit field, which indicates whether or not an error has occurred in the corresponding FIC segment during transmission. Herein, the error_indicator field is set to '1', when an error has occurred. And, the error_indicator field is set to '0', when an error does not exist (or has not occurred). More specifically, during the process of configuring the FIC segment, when a non-recovered error exists, the error_indicator field is set to '1'. More specifically, the error_indicator field enables the receiving system to recognize the existence (or presence) of an error within the corresponding FIC segment.

The FIC_segment_num field corresponds to a 4-bit unsigned integer number field, which indicates a number of the corresponding FIC segment. For example, if the corresponding FIC segment is the first FIC segment of the FIC chunk, the value of the FIC_segment_num field shall be set to '0x0'. Also, if the corresponding FIC segment is the second FIC segment of the FIC chunk, the value of the FIC_segment_num field shall be set to '0x1'. More specifically, the FIC_segment_num field shall be incremented by one with each additional FIC segment in the FIC chunk. Herein, if the FIC chunk is divided into 4 FIC segments, the FIC_segment_num field value of the last FIC segment within the FIC chunk will be indicated as '0x3'.

The FIC_last_segment_num field corresponds to a 4-bit unsigned integer number field, which indicates the number of the last FIC segment (i.e., the FIC segment having the highest FIC_segment_num field value) within a complete FIC chunk.

In the conventional method, FIC segment numbers are sequentially assigned (or allocated) for each FIC segment within one sub-frame. Therefore, in this case, the last FIC segment number always matches with the TNoG (i.e., the last FIC segment number is always equal to the TNoG). However, when using the FIC number assignment method according to the present invention, the last FIC segment number may not always match with the TNoG. More specifically, the last FIC segment number may match with the TNoG, or the last FIC segment number may not match with the TNoG. The TNoG represents a total number of data groups that are allocated (or assigned) to a single sub-frame. For example, when the TNoG is equal to '6', and when the FIC chunk is divided into 8 FIC segments, the TNoG is equal to '6', and the last FIC segment number is '8'.

According to another embodiment of the present invention, the null FIC segment may be identified by using the value of the FIC_segment_num field within the FIC segment header. More specifically, since an FIC segment number is not assigned to the null FIC segment, the transmitting system allocates null data to the FIC_segment_num field value of the null FIC segment, and the receiving system may allow the FIC segment having null data assigned to the FIC_segment_num field value to be recognized as the null FIC segment. Herein, instead of the null data, data pre-arranged by the receiving system and the transmitting system may be assigned to the FIC_segment_num field value, instead of the null data.

As described above, the FIC chunk is divided into a plurality of FIC segments, thereby being transmitted through a single sub-frame or being transmitted through multiple sub-frames. Also, FIC segments divided from a single FIC chunk may be transmitted through a single sub-frame, or FIC segments divided from multiple single FIC chunks may be transmitted through a single sub-frame. At this point, the number assigned to each FIC segment corresponds to a number within the corresponding FIC chunk (i.e., the FIC_seg_number value), and not the number within the corresponding sub-frame. Also, the null FIC segment may be transmitted for aligning the boundary of the M/H frame and the boundary of the FIC chunk. At this point, an FIC segment number is not assigned to the null FIC segment.

As described above, one FIC chunk may be transmitted through multiple sub-frames, or multiple FIC chunks may be transmitted through a single sub-frame. However, according to the embodiment of the present invention, the FIC segments are interleaved and transmitted in sub-frame units.

Meanwhile, FIG. 15 illustrates an exemplary structure of a bit stream syntax of an SMT section which is included in the RS frame and then transmitted. Herein, the SMT section is configured in an MPEG-2 private section format for simplicity. However, the SMT section data may be configured in any possible format.

The SMT may provide access information of mobile services within an ensemble including the SMT. Also, the SMT may provide information required for the rendering of mobile services. Furthermore, the SMT may include at least one or more descriptors. Herein, other additional (or supplementary) information may be described by the descriptor.

At this point, the service signaling channel that transmits the SMT may further include another signaling table (e.g., GAT) in addition to the SMT.

Herein, according to the embodiment of the present invention, IP datagrams of the service signaling channel have the same well-known destination IP address and the same well-known destination UDP port number. Therefore, the SMT included in the service signaling data is distinguished (or identified) by a table identifier. More specifically, the table identifier may correspond to a table_id existing in the corresponding table or in a header of the corresponding table section. And, when required, the table identifier may further refer to a table_id_extension field, so as to perform the identification process. Exemplary fields that can be transmitted through the SMT section will now be described in detail.

A table_id field is an 8-bit table identifier, which may be set up as an identifier for identifying the SMT.

A section_syntax_indicator field corresponds to an indicator defining the section format of the SMT. For example, the section_syntax_indicator field shall be set to '0' to always indicate that this table is derived from the "short" form of the MPEG-2 private section table format may correspond to MPEG long-form syntax.

A private_indicator field is a 1-bit field, which indicates whether or not the SMT follows (or is in accordance with) a private section.

A section_length field is a 12-bit field, which specifies the section length of the remaining SMT data bytes immediately following the section_length field.

A table_id_extension field corresponds to a table-dependent 16-bit field. Herein, the table_id_extension field corresponds to a logical portion of the table_id field providing the scope for the remaining fields. The table_id_extension field includes a SMT_protocol_version field and an ensemble_id field.

The SMT_protocol_version field corresponds to an 8-bit unsigned integer field. Herein, the SMT_protocol_version field indicates a protocol version for allowing the corresponding SMT to carry, in a future process, parameters that may be structure differently from those defined in the current protocol. Presently, the value of the SMT_protocol_version field shall be equal to zero (0). Non-zero values of the SMT_protocol_version field may be used by a future version of this standard to indicate structurally different tables.

The ensemble_id field corresponds to an 8-bit field. Herein, the ID values associated with the corresponding ensemble that can be assigned to the ensemble_id field may range from '0x00' and '0x3F'. It is preferable that the value of the ensemble_id field is derived from the TPC data of the parade_id field. When the corresponding ensemble is transmitted through a primary RS frame, the most significant bit (MSB) is set to '0', and the remaining 7 bits are used as the parade_id field value of the corresponding parade. Meanwhile, when the corresponding ensemble is transmitted through a primary RS frame, the most significant bit (MSB) is set to '1', and the remaining 7 bits are used as the parade_id field value of the corresponding parade.

A version_number field corresponds to a 5-bit field, which specifies the version number of the SMT.

A current_next_indicator field corresponds to a 1-bit field indicating whether or not the SMT section is currently applicable.

A section_number field is an 8-bit field specifying the number of the current SMT section.

A last_section_number field corresponds to an 8-bit field that specifies the number of the last section configuring the corresponding SMT.

And, a num_MH_services field corresponds to an 8-bit field, which specifies the number of mobile services in the corresponding SMT section.

Hereinafter, a number of 'for' loop (also referred to as mobile (M/H) service loop) statements equivalent to the number of mobile services corresponding to the num_MH_services field is performed so as to provide signaling information on multiple mobile services. More specifically, signaling information of the corresponding mobile service is indicated for each mobile service that is included in the SMT section. Herein, the following field information corresponding to each mobile service may be provided as described below.

An MH_service_id field corresponds to a 16-bit unsigned integer number, which can uniquely identify the corresponding mobile service within the scope of the corresponding SMT section.

A multi_ensemble_service field corresponds to a 2-bit field, which indicates whether the corresponding mobile service is transmitted through one or more ensembles. Since the multi_ensemble_service field has the same meaning as the multi_ensemble_service field included in the FIC chunk, detailed description of the same will be omitted for simplicity.

An MH_service_status field corresponds to a 2-bit field, which can identify the status of the corresponding mobile service. Herein, the MSB indicates whether the corresponding mobile service is active ('1') or whether the corresponding mobile service is inactive ('0'). Also, the LSB indicates whether the corresponding mobile service is hidden ('1') or not hidden ('0').

An SP_indicator field corresponds to a 1-bit field, which specifies service protection status of the corresponding mobile service. If the SP_indicator field is set to '1', then service protection is applied to at least one of the components needed to provide a meaningful presentation of the corresponding service.

A short_MH_service_name_length field corresponds to a 3-bit field, which indicates the length of a short service name described in a short_service_name field in byte-length units.

The short_MH_service_name_field indicates the short name of the corresponding mobile service.

An MH_service_category field is a 6-bit field, which identifies the type category of the corresponding mobile service.

A num_components field corresponds to a 5-bit field, which specifies the number of IP stream components in the corresponding mobile service.

An IP_version_flag field corresponds to a 1-bit indicator, which when set to '0' indicates that a source_IP_address field, an MH_service destination_IP_address field, and a component_destination_IP_address field correspond to IPv4 addresses. The value of '1' for the IP_version_flag field is reserved for any possible future indication that the source_IP_address field, the MH_service_destination_IP_address field, and the component_destination_IP_address field correspond to IPv6 addresses. However, the usage of IPv6 addressing is currently undefined.

A source_IP_address_flag corresponds to a 1-bit Boolean flag, which indicates, when set, that a source IP address value for the corresponding service exists (or is present) so as to indicate a source specific multicast.

An MH_service_destination_IP_address_flag corresponds to a 1-bit, which indicates, when set, that the corresponding IP stream component is transmitted through an IP datagram having a destination IP address different from that of the MH_service_destination_IP_address field. Therefore, when the MH_service_destination_IP_address_flag is set, the receiving system may use the component_destination_IP_address as the destination_IP_address in order to access the corresponding IP stream component. Furthermore, the receiving system ignores (or disregards) the MH_service_destination_IP_address field within the mobile service loop.

The source_IP_address field corresponds to a 32-bit field or a 128-bit field. When the source_IP_address_flag is set to '1', the source_IP_address field is required to be interpreted (or analyzed). However, when the source_IP_address_flag is set to '0', the source_IP_address field is not required to be interpreted (or analyzed). When the source_IP_address_flag is set to '1', and when the IP_version_flag field is set to '0', the corresponding field indicates that the source_IP_address field indicates a 32-bit IPv4 address specifying the corresponding mobile service source. Alternatively, if the IP_version_flag field is set to '1', the source_IP_address field indicates a 32-bit IPv6 address specifying the corresponding mobile service source.

The MH_service_destination_IP_address field corresponds to a 32-bit field or a 128-bit field. When the MH_service_destination_IP_address_flag field is set to '1', the MH_service_destination_IP_address_flag is required to be interpreted (or analyzed). However, when the MH_service_destination_IP_address_flag is set to '0', the MH_service_destination_IP_address_flag is not required to be interpreted (or analyzed). Herein, if the MH_service_destination_IP_address_flag is set to '1', and if the IP_version_flag field is set to '0', the MH_service_destination_IP_address field indicates a 32-bit destination IPv4 address for the corresponding mobile service.

Alternatively, if the MH_service_destination_IP_address_flag is set to '1', and if the IP_version_flag field is set to '1', the MH_service_destination_IP_address field indicates a 64-bit destination IPv6 address for the corresponding mobile service. In case the corresponding MH_service_destination_IP_address field cannot be interpreted, the component_destination_IP_address field within a component loop shall be interpreted. And, in this case, the receiving system shall use the component_destination_IP_address in order to access the IP stream component.

Meanwhile, the SMT according to the embodiment of the present invention provides information on multiple components using the 'for' loop statement. Hereinafter, a number of 'for' loop (also referred to as component loop) statements equivalent to the number of components corresponding to the num_component field value is performed so as to provide access information on multiple components. More specifically, access information of each component included in the corresponding mobile service is provided. In this case, the following field information on each component may be provided as described below.

An essential_component_indicator field is a 1-bit field, which indicates that the corresponding component is an essential component for the mobile service, when the essential_component_indicator field value is set to '1'. Otherwise, the essential_component_indicator field indicates that the corresponding component is an optional component. For example, in case of a basic layer audio stream and video stream, the essential_component_indicator field value is set to '1'. And, in case of the enhanced layer video stream, the essential_component_indicator field value is set to '0'.

A component_destination_IP_address_flag field corresponds to a 1-bit Boolean flag. When the component_destination_IP_address_flag field is set to '1', this indicates that a component_destination_IP_address exists for the corresponding component. A port_num_count field corresponds to a 6-bit field, which indicates a UDP port number associated with the corresponding UDP/IP stream component. Herein, the destination UDP Port number value is increased by 1 starting from a destination_UDP_port_num field value. The destination_UDP_port_num field corresponds to a 16-bit field, which indicates a destination UDP port number for the corresponding IP stream component.

A component_destination_IP_address field corresponds to a 32-bit field or a 128-bit field. When the IP_version_flag field is set to '0', the component_destination_IP_address field indicates a 32-bit destination IPv4 address for the corresponding IP stream component. Furthermore, when the IP_version_flag field is set to '1', the component_destination_IP_address field indicates a 128-bit destination IPv6 address for the corresponding IP stream component. When this field is present, the destination address of the IP datagrams carrying the corresponding component of the M/H service shall match the address in the component_destination_IP_address field. Alternatively, when this field is not present, the destination address of the IP datagrams carrying the corresponding component shall match the address in the M/H_service_destination_IP_address field. The conditional use of the 128 bit-long address version of this field is to facilitate possible future usage of the IPv6, although the usage of the IPv6 is currently undefined.

A num_component_level_descriptors field corresponds to a 4-bit field, indicating a number of descriptors providing additional information on the component level. A number of component_level_descriptor( ) corresponding to the value of the num_component_level_descriptors field is included in the component loop, so as to provide additional (or supplemental) information on the corresponding component. A num_MH_service_level_descriptors field corresponds to a 4-bit field indicating a number of descriptors providing additional information of the corresponding mobile service level.

A number of service_level_descriptor( ) corresponding to the value of the num_MH_service_level_descriptors field is included in the mobile service loop, so as to provide additional (or supplemental) information on the mobile service. A num_ensemble_level_descriptors field corresponds to a 4-bit field, which indicates a number of descriptors providing additional information on ensemble levels. Furthermore, a number of ensemble_level_descriptor( ) corresponding to the value of the num_ensemble_level_descriptors field is included in the ensemble loop, so as to provide additional (or supplemental) information on the ensemble.

FIG. 16 illustrates a bit stream syntax structure of a GAT section according to an embodiment of the present invention. Herein, the GAT section has been written in an MPEG-2 private section format merely to facilitate the understanding of the present invention.

The GAT section according to the present invention is included in the service signaling channel, thereby being received. At this point, since the IP datagrams of the service signaling channel have the same well-known IP address and the same well-known UDP port number, the identification of the GAT included in the service signaling data is performed by a table identifier. More specifically, the table identifier may correspond to a table_id field existing in the corresponding table or in the header of the corresponding table section. And, when required, identification may be performed by making further reference to a table_id_extension field.

The GAT section includes service guide provider information and also includes service guide bootstrapping information for each provider.

Referring to FIG. 16, a table_id field is an 8-bit field acting as the table identifier. The table_id field may be set as the identifier for identifying the GAT.

A section_syntax_indicator field is a 1-bit field, which corresponds to an indicator defining a GAT section format.

A private_indicator field is also a 1-bit field indicating to which private section the GAT belongs.

A section_length field is a 13-bit field, which indicates the section length of the GAT.

Also, the GAT of FIG. 16 assigns a 16-bit GAT_protocol_version field to the position of a table_id_extension field. Therefore, when the GAT is received through the service signaling channel, the GAT_protocol_version field may be used as one of the table identifiers that can identify the GAT. More specifically, the GAT_protocol_version field indicates the protocol version which allows, in the future, the corresponding GAT to carry (or deliver or transmit) parameters that may be structured differently than those defined in the current protocol. Presently, the value for the GAT_protocol_version field shall be equal to zero (0). And, non-zero values of the GAT_protocol_version field may be used by a future version of this standard to indicate structurally different tables.

A version_number field is a 5-bit field, which indicates the version number of the GAT.

A current_next_indicator field is a 1-bit field, which indicates whether the GAT section is currently (or presently) applicable or not.

A section_number field corresponds to an 8-bit field, which indicates the section number of the current GAT section.

A last_section_number field corresponds to an 8-bit field, which indicates the last section number of the GAT.

A num_SG_providers field indicates a number of SG providers described in the current GAT section.

An SG_provider_id field indicates a unique indicator that can identify each SG provider.

Hereinafter, a 'for' loop (also referred to as an SG provider loop) is repeated as many times as the value of the num_SG_providers field, so as to provide SG bootstrapping information for each SG provider. For example the following field information may be provided for each SG provider.

An SG_provider_name_length field is an 8-bit field, which indicates the total length of an SG_provider_name_text( ) field that follows.

The SG_provider_name_text( ) field corresponds to a variable-length field, which indicates the name of the corresponding SG provider. Herein, the SG_provider_name_text( ) field is configured in a multiple string structure.

An SG_delivery_network_type field corresponds to an 8-bit field indicating the type of delivery network through which the SG is being transmitted. FIG. 17 illustrates the significance of the SG_delivery_network_type field value according to the present invention.

An SG_bootstrapping_data_length field is an 8-bit field, which indicates the total length of an SG_bootstrap_data( ) field that follows.

The SG_bootstrap_data( ) field corresponds to a variable-length field, which provides SG bootstrapping information based upon the value of the SG_delivery_network_type field, as shown in FIG. 18 to FIG. 21.

Furthermore, each SG provider may provide additional information being applied for each SG provider by using the descriptor.

According to another embodiment of the present invention, the SG_level_descriptors( ) field included in the SG provider loop includes the SG_delivery_network_type_field, the SG_bootstrapping_data_length field, and the SG_bootstrap_data( ) field. Also, the SG_level_descriptors( ) may also provide SG bootstrapping information based upon the value of the SG_delivery_network_type field, as shown in FIG. 18 to FIG. 21.

Furthermore, a num_additional_descriptors field corresponds to an 8-bit field, which indicates the number of descriptors that follow. A additional_descriptor( ) field, which is repeated as many times as the value of the num_additional_descriptors field, describes additional information that may be applied to all SG providers included in the GAT section.

For example, when the value of the SG_delivery_network_type field is equal to '0x00', the SG is delivered through the same mobile (i.e., M/H) broadcast through which the GAT is delivered. More specifically, the SG is included and received as a single mobile service in the RS frame, wherein the RS frame belongs to the ensemble to which the GAT is delivered.

In another example, when the value of the SG_delivery_network_type field is equal to '0x01', the SG is delivered through a mobile (i.e., M/H) broadcast other than that through which the GAT is delivered. More specifically, the SG is included and received as a single mobile service in an RS frame, wherein the RS frame belongs to an ensemble other than that to which the GAT is delivered. FIG. 1 illustrates an embodiment of this example, wherein a service provider possessing a separate physical channel may gather and combine information for the service guide, which is provided from each broadcast station. Thereafter, the service provider may transmit the combined SG through the possessed physical channel as a single mobile service.

In yet another example, when the value of the SG_delivery_network_type field is equal to '0x02', the SG is delivered through an associated IP-based broadcast channel other, instead of the mobile broadcast. FIG. 2 illustrates an embodiment of this example. More specifically, in a hybrid system wherein a terrestrial mobile system is combined with a digital video broadcasting satellite services to handhelds (DVB-SH) system, which is used for European portable (or mobile) digital satellite TV broadcasting, DVB-SH operators (e.g., DVB-SH service providers) may gather and combine the information for service guides (e.g., schedule information on the corresponding mobile service) provided from a mobile broadcast station, so as to transmit the combined information to each receiving system through a DVB-SH network (i.e., satellite).

In yet another example, when the value of the SG_delivery_network_type field is equal to '0x03', the SG is delivered through an interaction (or a two-way or bi-directional) channel. FIG. 3 illustrates an embodiment of this example. More specifically, in a hybrid system configured by a combination of a terrestrial mobile system and an interaction channel system (e.g., a cellular system), an interaction (or two-way or bi-directional) channel SG provider (e.g., an operator or server manager equipped with an interaction (or two-way) channel network, such as a cellular network operator) may gather and combine the information for service guides (e.g., schedule information on the corresponding mobile service) provided from a mobile broadcast station, so as to transmit the combined information to each receiving system through an interaction (or two-way or bi-directional) channel.

FIG. 18 illustrates a bit stream syntax structure of the SG_bootstrap_data( ) field, when the SG_delivery_network_type field value is equal to '0x00' (i.e., when the SG is delivered through the current mobile broadcast). In other words, in this example, the SG delivering announcement information associated with the mobile service data is included and transmitted in the mobile broadcast signal delivering the mobile service data.

The SG bootstrapping information SG_bootstrap_data( ) of FIG. 18 includes a 16-bit MH_Service_id field and a 16-bit announcement_channel_TSI field.

When the SG_delivery_network_type field value is equal to '0x00', the SG is delivered as a single mobile service. Therefore, the MH_service_id field marks an identifier that can identify the mobile service including the SG data. At this point, access information of the mobile service for the SG data is signaled to the SMT that, which is included in the mobile broadcast signal delivering the SG, as shown in FIG. 15. More specifically, the MH_service_id field value of FIG. 18 is matched with one of the multiple MH_service_id field values, which are included in the mobile service loop of the SMT.

The announcement_channel_TSI field indicates a transmission session identifier (TSI) of a FLUTE session, which corresponds to an announcement channel of a mobile service including the SG data. In other words, the announcement_channel_TSI field value corresponds to an identifier that can uniquely identify the FLUTE session, which corresponds to the announcement channel. More specifically, by matching the MH_service_id field value of the SMT acquired from the current mobile broadcast with the MH_service_id field value of FIG. 18, IP access information (e.g., a destination_IP_address, a destination UDP port number) of the mobile service including the SG data may be acquired from the SMT. Also, by using the IP access information, an IP datagram may be acquired from the corresponding mobile broadcast signal (i.e., an RS frame belonging to an ensemble including the SMT and the GAT). Furthermore, by using the announcement_channel_TSI field value, an ALC/LCT header may be removed from the acquired IP datagram, thereby accessing the corresponding FLUTE session and receiving the SG data.

FIG. 19 illustrates a bit stream syntax structure of the SG_bootstrap_data( ) field included in the GAT, when the SG_delivery_network_type field value is equal to '0x01' (i.e., when the SG is delivered through a mobile broadcast signal other than that of the GAT). More specifically, when an SG associated with mobile services, which are transmitted through a mobile broadcast signal including the GAT, is transmitted through a different mobile broadcast signal, the SG_bootstrap_data( ) field of the GAT provides the bootstrapping information of the SG.

The SG bootstrapping information SG_bootstrap_data( ) of FIG. 19 includes a 16-bit transport_stream_id field, a 16-bit MH_Service_id field, and a 16-bit announcement_channel_TSI field. When the SG_delivery_network_type field value is equal to '0x01', the transport_stream_id field indicates a label that can identify the mobile broadcast signal transmitting the SG.

More specifically, the transport_stream_id field indicates a transport stream ID of the mobile broadcast signal transmitting the SG. The transport_stream_id field value of FIG. 19 is equal to the value of the transport_stream_id field within the header of a program map table (PAT) and within the FIC chunk header of FIG. 12.

Also, when the SG_delivery_network_type field value is equal to '0x01', the SG is delivered as a single mobile service. Therefore, the MH_service_id field marks an identifier that can identify the mobile service including the SG data. At this point, IP access information of the mobile service for the SG data is signaled to the SMT that, which is included in the mobile broadcast signal delivering the SG, and not the mobile broadcast signal delivering the GAT, as shown in FIG. 15. More specifically, the MH_service_id field value of FIG. 19 is matched with one of the multiple MH_service_id field values, which are included in the mobile service loop of the SMT.

The announcement_channel_TSI field indicates a transmission session identifier (TSI) of a FLUTE session, which corresponds to an announcement channel of a mobile service including the SG data.

More specifically, when the SG_delivery_network_type field value is equal to '0x01', the mobile broadcast signal corresponding to the transport_stream_id field of FIG. 19 is received once again. Then, by matching the MH_service_id field value of the SMT acquired from the received mobile broadcast signal with the MH_service_id field value of FIG. 19, IP access information (e.g., a destination_IP_address, a destination UDP port number) of the mobile service including the SG data may be acquired from the SMT. Also, by using the IP access information, an IP datagram may be acquired from the corresponding mobile broadcast signal (i.e., an RS frame belonging to an ensemble including the SMT). Furthermore, after removing an ALC/LCT header from the acquired IP datagram, the corresponding FLUTE session may be accessed and the SG data may be received by using the announcement_channel_TSI field value.

FIG. 20 illustrates a bit stream syntax structure of the SG_bootstrap_data( ) field included in the GAT, when the SG_delivery_network_type field value is equal to '0x02' (i.e., when the SG is delivered through a different IP-based broadcast network). More specifically, when an SG associated with mobile services, which are transmitted through a mobile broadcast signal including the GAT, is transmitted through a different IP-based broadcast network, the SG_bootstrap_data( ) field of the GAT provides the bootstrapping information of the SG.

The SG bootstrapping information SG_bootstrap_data( ) of FIG. 20 includes a 1-bit IP_version_flag field, a 1-bit source_IP_address_flag field, a 32-bit (or 128 bit) SG_bootstrap_destination_IP_address field, a 16-bit SG_bootstrap_destination_UDP_port_num field, and a 16-bit announcement_channel_TSI field. Furthermore, depending upon the source_IP_address_flag field value, the SG_bootstrap_data( ) may further include a 32-bit (or 128 bit) SG_bootstrap_source_IP_address field.

Referring to FIG. 20, when the source_IP_address_flag field value is set to '1', the source_IP_address_flag field indicates that a source IP address value for the corresponding SG announcement channel exists in order to indicate a source-specific multicast.

When the value of the IP_version_flag field is set to '1', this indicates that the source_IP_address field and the SG_bootstrap_destination_IP_address field are IPv6 addresses. Alternatively, when the value of the IP_version_flag field is set to '0', this indicates that the source_IP_address field and the SG_bootstrap_destination_IP_address field are IPv4 addresses.

The source_IP_address field corresponds to a 32-bit or 128-bit field. Herein, the source_IP_address field will be significant (or requires analysis), when the value of the source_IP_address_flag field is set to '1'. However, when the value of the source_IP_address_flag field is set to '0', the source_IP_address field will become insignificant (or will not require analysis). Herein, when the value of the source_IP_address_flag field is set to '1', the source_IP_address field marks the source_IP_address of all IP datagrams transmitting the SG announcement channel with 32 bits or 128 bits. When the source_IP_address_flag field value is set to '1', and when the IP_version_flag field value is set to '0', the source_IP_address field is indicated as a 32-bit IPv4 address. Alternatively, when the IP_version_flag field value is set to '1', the source_IP_address field indicates a 128-bit IPv6 address, which shows the source of the corresponding virtual channel.

The SG_bootstrap_destination_IP_address field indicates the destination_IP_address of the SG announcement channel. Herein, when the IP_version_flag field value is set to '0', the SG_bootstrap_destination_IP_address field is indicated as a 32-bit IPv4 address. Alternatively, when the IP_version_flag field value is set to '1', the SG_bootstrap_destination_IP_address field indicates a 128-bit IPv6 address, which shows the source of the corresponding virtual channel.

The SG_bootstrap_destination_UDP_port_number field indicates the destination UDP port number of the SG announcement channel.

The announcement_channel_TSI field indicates a transmission session identifier (TSI) of a FLUTE session, which corresponds to an announcement channel of the SG.

More specifically, an IP datagram is acquired from a broadcast signal, which is received through a different broadcast network (i.e., another IP-based broadcast network) transmitting the SG, by using the SG_bootstrap_destination_IP_address field and the SG_bootstrap_destination_UDP_port_num field of FIG. 20. Then, after removing the ALC/LCT header from the acquired IP datagram, connection may be made to the corresponding FLUTE session by using the announcement_channel_TSI field value, so as to receive the SG data.

FIG. 21 illustrates a bit stream syntax structure of the SG_bootstrap_data( ) field included in the GAT, when the SG_delivery_network_type field value is equal to '0x03' (i.e., when the SG is delivered through an interaction (or two-way) channel). More specifically, when an SG associated with M/H services, which are transmitted through an M/H broadcast signal including the GAT, is transmitted through an interaction (or two-way) channel, the SG_bootstrap_data( ) field of the GAT provides the bootstrapping information of the SG.

The SG bootstrapping information SG_bootstrap_data( ) of FIG. 21 includes an 8-bit SG_entrypoint_URL_text_length field and a variable-length SG_entrypoint_URL_text field. The SG_entrypoint_URL_text_length field indicates, in byte units, the total length of the SG_entrypoint_URL_text field that follows. The SG_entrypoint_URL_text field indicates a uniform resource locator (URL), which indicates the location of the SG entry point. More specifically, the interaction channel transmitting the SG is accessed, based upon the value of the SG_entrypoint_URL_text field, so as to receive the SG data.

Figure 22:
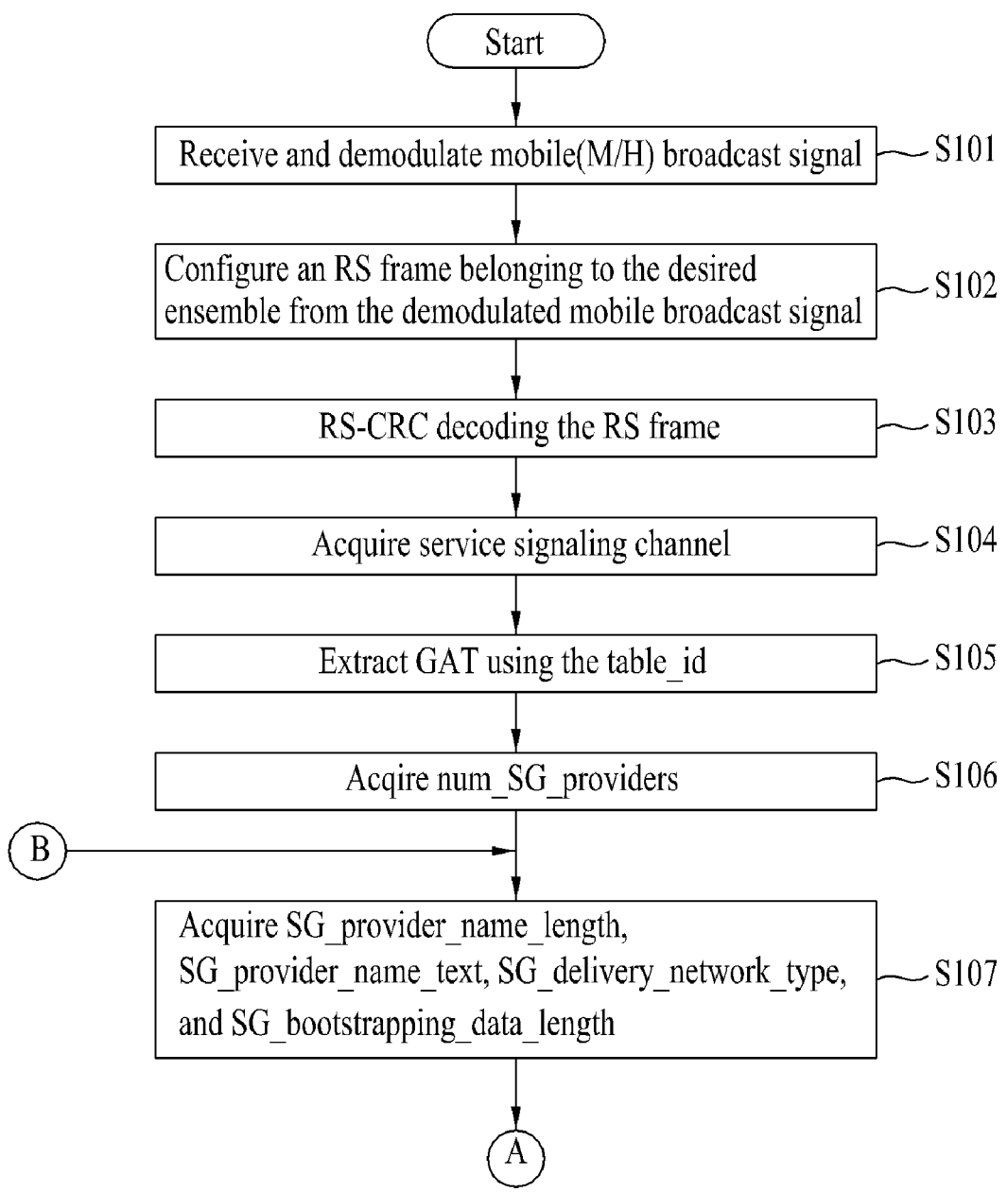
FIG. 22 and FIG. 23 illustrate a flow chart showing process steps for performing service guide bootstrapping according to an embodiment of the present invention.
Figure 23:
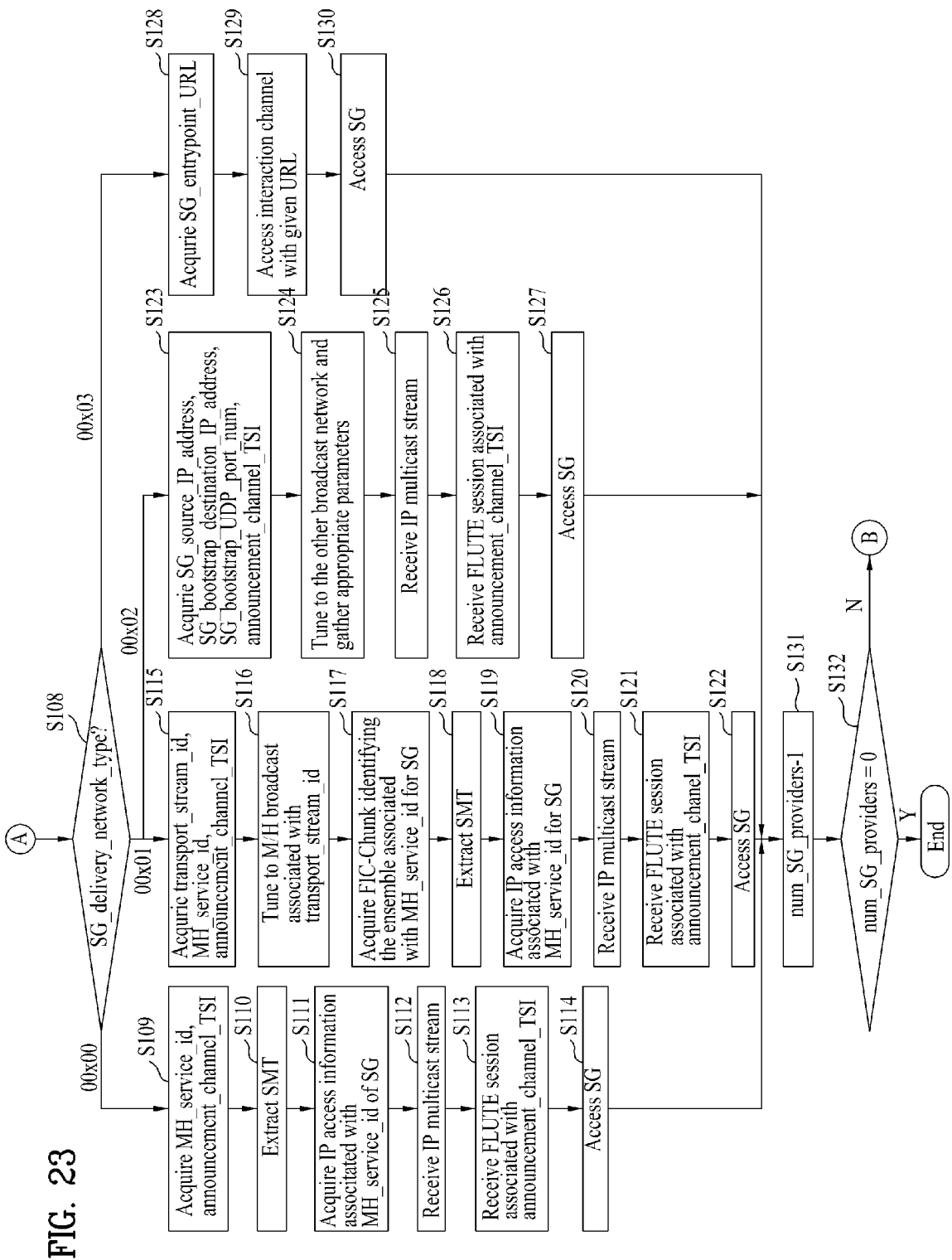

FIG. 22 and FIG. 23 illustrate a flow chart showing a method of performing bootstrapping for a service guide according to an embodiment of the present invention.

First of all, a mobile (i.e., M/H) broadcast signal including a user-selected mobile (i.e., M/H) service is received and demodulated (S101). Then, FIC segments are acquired from the demodulated mobile broadcast signal, and an FIC chunk is recovered based upon the acquired FIC segments. Mapping information between an ensemble and a mobile service is configured by using the information included in the recovered FIC chunk (S102). The mapping information between the ensemble and the mobile service may include an ensemble identifier, a mobile service identifier included in the ensemble, which is identified by the ensemble identifier, and service type information and so on.

Additionally, an RS frame including the user-selected mobile service is configured from the demodulated mobile broadcast signal, and CRC-decoding and RS-decoding are performed on the RS frame (S103). Thereafter, a service signaling channel is acquired from the CRC-decoded and RS-decoded RS frame (i.e., RS frame payload) (S104). Subsequently, a GAT section included in the service signaling channel is extracted (S105). More specifically, the GAT section is extracted from an IP datagram of a service signaling channel having the same well-known IP address and the same well-known UDP port number (e.g., an IP multicast stream) by using a table identifier.

Then, a number of SG providers (num_SG_providers) described in the GAT section is acquired from the GAT section (S106). The process steps following step 106 are repeated as many times as the acquired number of SG providers, so that SG bootstrapping information for each SG provider is gathered and the SG provided by each SG provider is accessed.

More specifically, name information of the corresponding SG provider (SG_provider_name_length, SG_provider_name_text), information on an SG delivery network type (SG_delivery_network_type) through which the SG is transmitted, and information on a bootstrapping data length of the SG (SG_bootstrapping_data_length) are acquired for each SG provider (S107).

Subsequently, SG bootstrapping information is acquired in step 107 depending upon the SG_delivery network type information (SG_delivery_network_type), and the corresponding SG is accessed by using the acquired SG bootstrapping information.

If it is verified in step 108 that the SG_delivery_network_type field value is equal to '0x00', a mobile service identifier (MH_service_id) and a transmission session identifier of an announcement channel (announcement_channel_TSI) are acquired from the SG_bootstrap_data( ) shown in FIG. 18 (S109).

Thereafter, an SMT included in the service signaling channel acquired in step 104 is extracted (S110). Then, an IP access information associated with the M/H service identifier acquired in step 109 is acquired from the SMT extracted in step 110 (S111). An IP multicast stream is acquired from the RS frame, which belongs to the ensemble including the SMT, (i.e., from the RS frame CRC-decoded and RS-decoded in step 103) based upon the acquired IP access information (S112). Then, after removing the ALC/LCT header from the acquired IP multicast stream, a FLUTE session associated with the announcement_channel_TSI field is received (or joined) (S113), SG data is accessed (S114).

More specifically, by matching the MH_service_id field value of the SMT acquired from the current mobile broadcast signal with the MH_service_id field value of FIG. 18, IP access information (e.g., a destination_IP_address and a destination UDP port number) of the mobile service including the SG data is acquired from the SMT. Thereafter, an IP datagram (i.e., IP multicast stream) is acquired from a corresponding mobile broadcast signal (i.e., an RS frame that belongs to an ensemble including the SMT) by using the IP access information. Then, after removing the ALC/LCT header from the acquired IP datagram, access made to the corresponding FLUTE session by using the announcement_channel_TSI field value, so as to receive the SG data.

Meanwhile, when it is verified in step 108 that the SG_delivery_network_type field value is equal to '0x01', a transport stream identifier (transport_stream_id), a mobile service identifier (MH_service_id), and a transmission session identifier of an announcement channel (announcement_channel_TSI) are acquired from the SG_bootstrap_data( ) shown in FIG. 19 (S115). Then, a mobile broadcast signal associated with the transport stream identifier (transport_stream_id) is received and demodulated (S116). For example, the mobile broadcast signal received in step 116 and the mobile broadcast signal received in step 101 each have different transport stream identifiers.

Subsequently, FIC segments are acquired from the mobile broadcast signal demodulated in step 116 and an FIC chunk is recovered based upon the acquired FIC segments. Then, an ensemble associated with the mobile broadcast signal acquired in step 115 is identified from the recovered FIC chunk (S117). Thereafter, an RS frame belonging to the ensemble, which is identified from the mobile broadcast signal demodulated in step 116, is configured, thereby performing CRC-decoding and RS-decoding on the RS frame. Then, a service signaling channel is acquired from the CRC-decoded and RS-decoded RS frame (i.e., from the RS frame payload), so as to extract an SMT included in the service signaling channel (S118). More specifically, an SMT section is extracted from an IP datagram of a service signaling channel having the same well-known IP address and the same well-known UDP port number (e.g., an IP multicast stream) by using a table identifier.

Then, an IP access information associated with the M/H service identifier acquired in step 115 is acquired from the SMT extracted in step 118 (S119). An IP multicast stream is acquired from the RS frame, which includes the SMT extracted in step 118, based upon the acquired IP access information (S120). Then, after removing the ALC/LCT header from the acquired IP multicast stream, a FLUTE session associated with the announcement_channel_TSI field is received (or joined) (S121), thereby accessing the SG data (S122).

More specifically, after receiving a mobile broadcast signal corresponding to the transport_stream_id field of FIG. 19, by matching the MH_service_id field value of the SMT acquired from the current mobile broadcast signal with the MH_service_id field value of FIG. 19, IP access information (e.g., a destination_IP_address and a destination UDP port number) of the mobile service including the SG data is acquired from the SMT. Thereafter, an IP datagram (i.e., IP multicast stream) is acquired from a corresponding mobile broadcast signal (i.e., an RS frame that belongs to the corresponding ensemble) by using the IP access information. Then, after removing the ALC/LCT header from the acquired IP datagram, connection made to the corresponding FLUTE session by using the announcement_channel_TSI field value, so as to receive the SG data.

Meanwhile, if it is verified in step 108 that the SG_delivery_network_type field value is equal to '0x02', an IP access information for SG bootstrapping and a transmission session identifier of an announcement channel (announcement_channel_TSI) are acquired from the SG_bootstrap_data( ) shown in FIG. 20 (S123). Herein, the IP access information for SG bootstrapping includes an SG bootstrap destination_IP_address SG_bootstrap_destination_IP_address field) and an SG bootstrap destination UDP port number (SG_bootstrap_destination_UDP_port_num_field). The IP access information for SG bootstrapping may further include an SG bootstrap source IP address (SG_bootstrap_source_IP_address field).

When SG bootstrapping information of the corresponding SG provider is acquired in step 123, another broadcast network transmitting the SG is tuned, so as to gather (or collect) the appropriate parameters (S124). Thereafter, by using the parameters, an IP multicast stream is acquired from the other broadcast network (S125). Then, after removing the ALC/LCT header from the acquired IP multicast stream, a FLUTE session associated with the announcement_channel_TSI field is received (or joined) (S126), thereby accessing the SG data (S127).

More specifically, an IP datagram is acquired from a broadcast signal, which is received through a different broadcast network (i.e., another IP-based broadcast network) transmitting the SG, by using the SG_bootstrap_destination_IP_address field and the SG_bootstrap_destination_UDP_port_num field of FIG. 20. Then, after removing the ALC/LCT header from the acquired IP datagram, connection may be made to the corresponding FLUTE session by using the announcement_channel_TSI field value, so as to receive the SG data.

Meanwhile, if it is verified in step 108 that the SG_delivery_network_type field value is equal to '0x03', an access information for SG bootstrapping is acquired from the SG_bootstrap_data( ) shown in FIG. 21 (S128). Herein, the access information includes an SG entry point URL (SG_entrypoint_URL field). Also, an interaction (or two-way or bi-directional) channel is accessed, based upon the access information (S129), so as to receive the SG data (S130). When the SG data are received by performing any one of step 114, step 122, step 127, and step 130, after subtracting '1' from the num_SG_providers field value acquired in step 106 (S131), it is verified whether the num_SG_providers field value is equal to '0' (S132). If the num_SG_providers field value is not equal to '0', the process returns to step 107, so as to extract bootstrapping information for accessing the SG, which is transmitted by the next SG provider, thereby performing the process of accessing the SG. Alternatively, if the num_SG_providers field value not equal to '0', this indicates that all SGs provided from the SG providers included in the GAP section have been received. Therefore, the SG bootstrapping process is terminated.

Receiving System

Figure 24:
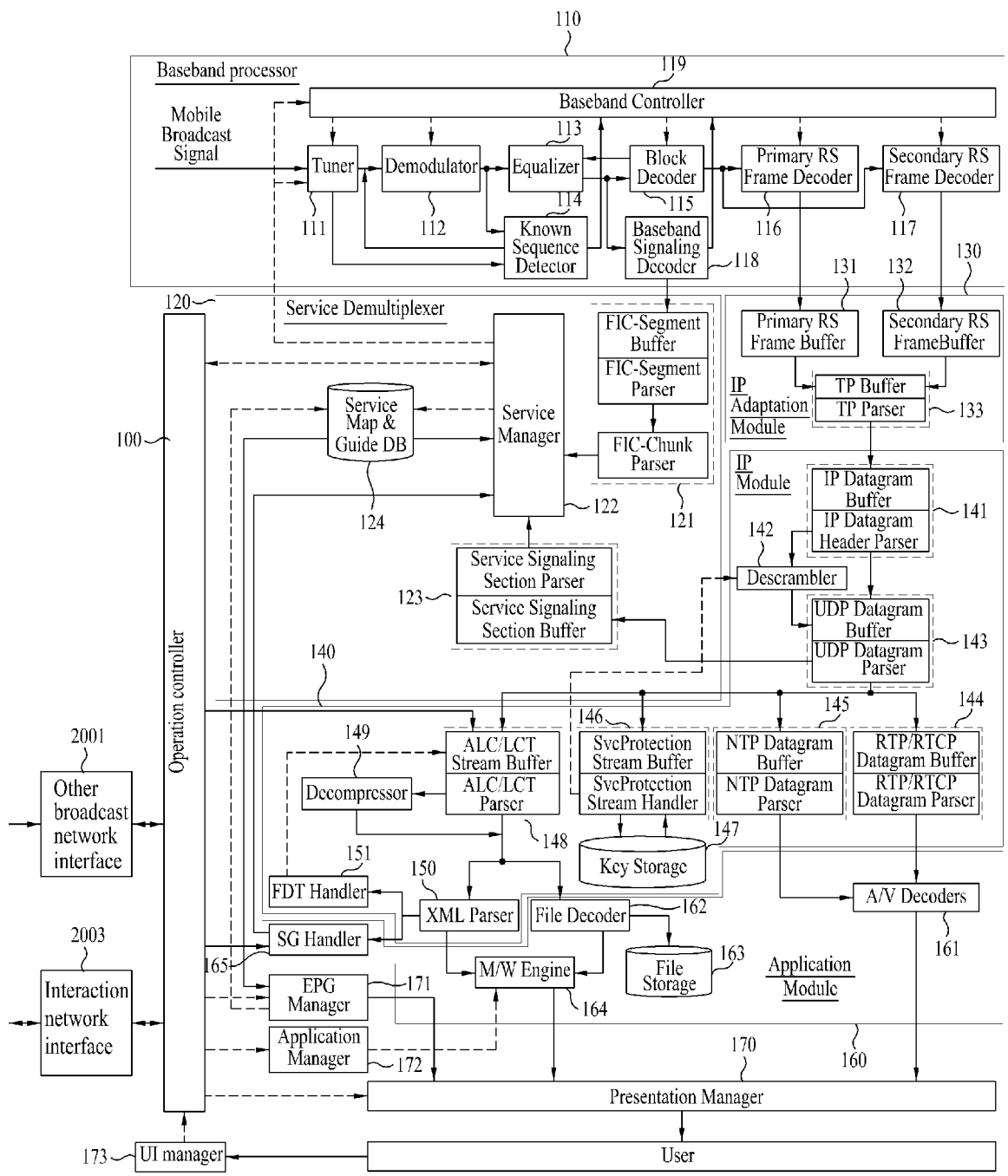
FIG. 24 illustrates a block diagram showing the structure of a receiving system according to an embodiment of the present invention.

FIG. 24 illustrates an embodiment of a receiving system according to the present invention. In FIG. 24, a solid arrow denotes a data path and a dotted arrow denotes a control signal path.

The receiving system according to the present invention may include an operation controller 2100, a tuner 2111, a demodulator 2112, an equalizer 2113, a known sequence detector (or known data detector) 2114, a block decoder 2115, a primary Reed-Solomon (RS) frame decoder 2116, a secondary RS frame decoder 2117, a signaling decoder 2118, and a baseband controller 2119. The receiving system according to the present invention may further include an FIC handler 2121, a service manager 2122, a service signaling handler 2123, and a first storage unit 2124. The receiving system according to the present invention may further include a primary RS frame buffer 2131, a secondary RS frame buffer 2132, and a transport packet (TS) handler 2133. The receiving system according to the present invention may further include an Internet Protocol (IP) datagram handler 2141, a descrambler 2142, an User Datagram Protocol (UDP) datagram handler 2143, a Real-time Transport Protocol/Real-time Transport Control Protocol (RTP/RTCP) datagram handler 2144, a Network Time Protocol (NTP) datagram handler 2145, a service protection stream handler 2146, a second storage unit 2147, an Asynchronous Layered Coding/Layered Coding Transport (ALC/LCT) stream handler 2148, an Extensible Mark-up Language (XML) parser 2150, and a Field Device Tool (FDT) handler 2151. The receiving system according to the present invention may further include an Audio/Video (A/V) decoder 2161, a file decoder 2162, a third storage unit 2163, a middleware (M/W) engine 2164, and a Service Guide (SG) handler 2165. The receiving system according to the present invention may further include an Electronic Program Guide (EPG) manager 2171, an application manager 2172, and an User Interface (UI) manager 2173. Additionally, the receiving system further includes another broadcast network interface 2001 for receiving a service guide, which is transmitted through another broadcast network, and an interaction (or two-way or bi-directional) network interface 2003 for receiving a service guide, which is transmitted through an interaction channel. According to the embodiment of the present invention, the interaction network interface 2003 constructs an interface with an IP-based interaction network regardless of a physical medium, such as wireless or optical medium.

Herein, for simplicity of the description of the present invention, the operation controller 2100, the tuner 2111, the demodulator 2112, the equalizer 2113, the known sequence detector (or known data detector) 2114, the block decoder 2115, the primary RS frame decoder 2116, the secondary RS frame decoder 2117, the signaling decoder 2118, and the baseband controller 2119 will be collectively referred to as a baseband processor 2110. The FIC handler 2121, the service manager 2122, the service signaling handler 2123, and the first storage unit 2124 will be collectively referred to as a service multiplexer 2120. The primary RS frame buffer 2131, the secondary RS frame buffer 2132, and the TS handler 2133 will be collectively referred to as an IP adaptation module 2130. The IP datagram handler 2141, the descrambler 2142, the UDP datagram handler 2143, the RTP/RTCP datagram handler 2144, the NTP datagram handler 2145, the service protection stream handler 2146, the second storage unit 2147, the ALC/LCT stream handler 2148, the XML parser 2150, and the FDT handler 2151 will be collectively referred to as a common IP module 2140. The A/V decoder 2161, the file decoder 2162, the third storage unit 2163, the M/W engine 2164, and the SG handler 2165 will be collectively referred to as an application module 2160.

In addition, although the terms used in FIG. 24 are selected from generally known and used terms, some of the terms mentioned in the description of FIG. 24 have been selected by the applicant at his or her discretion, the detailed meanings of which are described in relevant parts of the description herein. Furthermore, it is required that the present invention is understood, not simply by the actual terms used but by the meaning of each term lying within.

Referring to FIG. 24, the baseband controller 2119 controls the operation of each block included in the baseband processor 2110.

By tuning the receiving system to a specific physical channel frequency (or physical transmission channel frequency, PTC), the tuner 2111 enables the receiving system to receive main service data, which correspond to broadcast signals for fixed-type broadcast receiving systems, and mobile service data, which correspond to broadcast signals for mobile broadcast receiving systems. At this point, the tuned frequency of the specific physical channel is down-converted to an intermediate frequency (IF) signal, thereby being outputted to the demodulator 2112 and the known sequence detector 2114.

At this point, the tuner 2111 may receive main service data and mobile service data, or the tuner 2111 may receive a service guide associated with the mobile service data or service guide data associated with another set of mobile service data.

More specifically, the service guide delivering announcement information on the mobile service data included in the mobile broadcast signal, which is currently being received, may be received by being included in the mobile broadcast signal or received through a mobile broadcast signal of another physical channel. In this case, the service guide is received and processed by the tuner 2111 of the baseband processing unit 2110 based upon the control of the service manager 2122 and/or the operation controller 2100. Also, the service guide may be transmitted through a different broadcast network. And, the service guide being transmitted through the other broadcast network is received and processed by the other broadcast network interface 2001 based upon the control of the service manager 2122 and/or the operation controller 2100. Furthermore, the service guide may be transmitted through an interaction channel. And, the service guide being transmitted through the interaction channel is received and processed by the interaction network interface 2003 based upon the control of the service manager 2122 and/or the operation controller 2100.

The passband digital IF signal being outputted from the tuner 2111 may only include main service data, or only include mobile service data, or include both main service data and mobile service data.

The demodulator 2112 performs self-gain control, carrier recovery, and timing recovery processes on the passband digital IF signal inputted from the tuner 2111, thereby modifying the IF signal to a baseband signal. Then, the demodulator 2112 outputs the baseband signal to the equalizer 2113 and the known sequence detector 2114. The demodulator 2112 uses the known data symbol sequence inputted from the known sequence detector 2114 during the timing and/or carrier recovery, thereby enhancing the demodulating performance.

The equalizer 2113 compensates channel-associated distortion included in the signal demodulated by the demodulator 2112. Then, the equalizer 2113 outputs the distortion-compensated signal to the block decoder 2115. By using a known data symbol sequence inputted from the known sequence detector 2114, the equalizer 2113 may enhance the equalizing performance. Furthermore, the equalizer 2113 may receive feed-back on the decoding result from the block decoder 2115, thereby enhancing the equalizing performance.

The known sequence detector 2114 detects known data place (or position) inserted by the transmitting system from the input/output data (i.e., data prior to being demodulated or data being processed with partial demodulation). Then, the known sequence detector 2114 outputs the detected known data position information and known data sequence generated from the detected position information to the demodulator 2112, the equalizer 2113, and the baseband controller 2119. Additionally, in order to allow the block decoder 2115 to identify the mobile service data that have been processed with additional encoding by the transmitting system and the main service data that have not been processed with any additional encoding, the known sequence detector 2114 outputs such corresponding information to the block decoder 2115.

If the data channel-equalized by the equalizer 2113 and inputted to the block decoder 2115 correspond to data processed with both block-encoding of serial concatenated convolution code (SCCC) method and trellis-encoding by the transmitting system (i.e., data within the RS frame, signaling data), the block decoder 2115 may perform trellis-decoding and block-decoding as inverse processes of the transmitting system. On the other hand, if the data channel-equalized by the equalizer 2113 and inputted to the block decoder 2115 correspond to data processed only with trellis-encoding and not block-encoding by the transmitting system (i.e., main service data), the block decoder 2115 may perform only trellis-decoding.

The signaling decoder 2118 decodes signaling data that have been channel-equalized and inputted from the equalizer 2113. It is assumed that the signaling data (or signaling information) inputted to the signaling decoder 2118 correspond to data processed with both block-encoding and trellis-encoding by the transmitting system. Examples of such signaling data may include transmission parameter channel (TPC) data and fast information channel (FIC) data.

For example, among the data that are being inputted, the signaling decoder 2118 performs regressive turbo decoding of a parallel concatenated convolution code (PCCC) method on data corresponding to the signaling information region. Subsequently, the signaling decoder 2118 separates FIC data and TPC data from the regressive-turbo-decoded signaling data. Additionally, the signaling decoder 2118 performs RS-decoding as inverse processes of the transmitting system on the separated TPC data, thereby outputting the processed data to the baseband controller 2119. Also, the signaling decoder 2118 performs deinterleaving in sub-frame units on the separated FIC data, so as to perform RS-decoding as inverse processes of the transmitting system on the deinterleaved FIC data, thereby outputting the processed data to the FIC handler 2121. The FIC data being deinterleaved and RS-decoded from the signaling decoder 2118 and outputted to the FIC handler 2121 are transmitted in units of FIC segments.

The FIC handler 2121 receives FIC data from the signaling decoder 2118, so as to extract signaling information for service acquisition (i.e., mapping information between an ensemble and a mobile service). In order to do so, the FIC handler 2121 may include an FIC segment buffer, an FIC segment parser, and an FIC chunk parser.

The FIC segment buffer buffers FIC segment groups being inputted in M/H frame units from the signaling decoder 2118, thereby outputting the buffered FIC segment groups to the FIC segment parser. Thereafter, the FIC segment parser extracts the header of each FIC segment stored in the FIC segment buffer so as to analyze the extracted headers. Then, based upon the analyzed result, the FIC segment parser outputs the payload of the respective FIC segments to the FIC chunk parser. The FIC chunk parser uses the analyzed result outputted from the FIC segment parser so as to recover the FIC chunk data structure from the FIC segment payloads, thereby analyzing the received FIC chunk data structure. Subsequently, the FIC chunk parser extracts the signaling information for service acquisition. The signaling information acquired from the FIC chunk parser is outputted to the service manager 2122.

Meanwhile, the service signaling handler 2123 is configured by including a service signaling buffer and a service signaling parser. And, the service signaling handler 2123 buffers the table sections (e.g., SMT section, GAT section) included in the service signaling channel, which is transmitted from the UDP datagram handler 2143, thereby analyzing and processing the buffered table sections. The SMT information and GAT information processed by the service signaling handler 2123 are also outputted to the service manager 2122.

According to the embodiment of the present invention, the service signaling channel transmitting the SMT section and the GAT section is included in the corresponding RS frame in a UDP/IP packet format having a well-known IP destination address and a well-known destination UDP port number, thereby being received. Accordingly, in the receiving system, a service signaling channel may be acquired without requiring separate IP access information. Furthermore, each signaling table (e.g., SMT, GAT, etc.) within the acquired service signaling channel is identified by using a table identifier.

The SMT section provides signaling information on all services (including IP access information) within the ensemble, which includes the SMT section. Therefore, an IP stream component belonging to a requested service is accessed by using the information parsed from the SMT, so as to provide the corresponding service to the user. Furthermore, if service guide data are included in an ensemble, which includes the SMT section, as a signaled mobile service, so as to be received, the SMT section provides IP access information of the mobile service including the SG data.

Additionally, the GAT section provides information on the SG providers each transmitting a service guide and service guide bootstrapping information, which is required for accessing the SG. The SG bootstrapping information may very depending upon the SG transmission method and includes access information on the corresponding SG. Furthermore, the SG bootstrapping information may further include a transmission session identifier of an announcement channel.

The service manager 2122 uses the SG bootstrapping information, which is included in the GAT and signaled for each SG provider, so as to receive the corresponding SG from any one of the current RS frame, the tuner 2111, the other broadcast network interface 2001, and the interaction network interface. More specifically, based upon the SG bootstrapping information signaled to the GAT, which has been extracted from the mobile broadcast signal received through the tuner 2111, a service guide associated with the mobile broadcast signal is received from any one of the corresponding mobile broadcast signal, a mobile broadcast signal of another physical channel, another broadcast network, and an interaction channel. The received SG is either outputted to the ALC/LCT handler 2148 or outputted to the SG handler 2165.

Since the process of receiving the corresponding SG using the SG bootstrapping information has been described in detail with reference to FIG. 16 to FIG. 22, detailed description of the same will be omitted for simplicity.

The information parsed from the SMT is collected by the service manager 2122 and is then stored in the first storage unit 2124. The service manager 2122 stores the information extracted from the SMT in the first storage unit 2124 in a service map and guide data format.

That is, the service manager 2122 uses the signaling information collected from each of the FIC handler 2121 and the service signaling handler 2123, so as to configure a service map. Thereafter, the service manager 2122 uses a service guide (SG) collected from the service guide (SG) handler 2165 so as to draw up a program guide. Then, the service manager 2122 controls the baseband controller 2119 so that a user can receive (or be provided with) a user-requested mobile service by referring to the service map and service guide. Furthermore, the service manager 2122 may also control the system so that the program guide can be displayed on at least a portion of the display screen based upon the user's input.

The first storage unit 2124 stores the service map and service guide drawn up by the service manager 2122. Also, based upon the requests from the service manager 2122 and the EPG manager 2171, the first storage unit 2124 extracts the required data, which are then transferred to the service manager 2122 and/or the EPG manager 2171.

The baseband controller 2119 receives the known data place information and TPC data, thereby transferring M/H frame time information, information indicating whether or not a data group exists in a selected parade, place information of known data within a corresponding data group, power control information, and so on to each block within the baseband processor 2110. The TPC data will be described in detail in a later.

Meanwhile, according to the present invention, the transmitting system uses RS frames by encoding units. Herein, the RS frame may be divided into a primary RS frame and a secondary RS frame. However, according to the embodiment of the present invention, the primary RS frame and the secondary RS frame will be divided based upon the level of importance of the corresponding data.

The primary RS frame decoder 2116 receives, as an input, the output of the block decoder 2115. Here, in an embodiment, the primary RS frame decoder 2116 receives mobile service data, which has been encoded through Reed Solomon (RS) encoding and/or Cyclic Redundancy Check (CRC) encoding, from the block decoder 2115. The primary RS frame decoder 2116 may also receive SMT section data, GAT section data or SG data, which has been encoded through Reed Solomon (RS) encoding and/or Cyclic Redundancy Check (CRC) encoding, from the block decoder 2115.

The primary RS frame decoder 2116 performs inverse processes of an RS frame encoder (not shown) included in the transmitting system, thereby correcting errors existing within the primary RS frame. More specifically, the primary RS frame decoder 2116 forms a primary RS frame by grouping a plurality of data groups and, then, correct errors in primary RS frame units. In other words, the primary RS frame decoder 2116 decodes primary RS frames, which are being transmitted for actual broadcast services. The primary RS frame decoded by the primary RS frame decoder 2116 outputs to the primary RS frame buffer 2131. The primary RS frame buffer 2131 buffers the primary RS frame, and then configures an M/H TP in each row unit. The M/H TPs of the primary RS frame outputs to the TP handler 2133.

Additionally, the secondary RS frame decoder 2117 receives, as an input, the output of the block decoder 2115. Herein, in an embodiment, the secondary RS frame decoder 2117 receives mobile service data, which has been encoded through Reed Solomon (RS) encoding and/or Cyclic Redundancy Check (CRC) encoding, from the block decoder 2115. The secondary RS frame decoder 2117 may also receive SMT section data, GAT section data or SG data, which has been encoded through Reed Solomon (RS) encoding and/or Cyclic Redundancy Check (CRC) encoding, from the block decoder 2115.

The secondary RS frame decoder 2117 performs inverse processes of an RS frame encoder (not shown) included in the transmitting system, thereby correcting errors existing within the secondary RS frame. More specifically, the secondary RS frame decoder 2117 forms a secondary RS frame by grouping a plurality of data groups and, then, correct errors in secondary RS frame units. In other words, the secondary RS frame decoder 2117 decodes secondary RS frames, which are being transmitted for actual broadcast services. The secondary RS frame decoded by the secondary RS frame decoder 2117 outputs to the secondary RS frame buffer 2132. The secondary RS frame buffer 2132 buffers the secondary RS frame, and then configures an M/H TP in each row unit. The M/H TPs of the secondary RS frame outputs to the TP handler 2133.

The TP handler 2133 consists of a TP buffer and a TP parser. The TP handler 2133 buffers the M/H TPs inputted from the primary RS frame buffer 2131 and the secondary RS frame buffer 2132, and then extracts and analyzes each header of the buffered M/H TPs, thereby recovering IP datagram from each payload of the corresponding M/H TPs. The recovered IP datagram is outputted to the IP datagram handler 2141.

The IP datagram handler 2141 consists of an IP datagram buffer and an IP datagram parser. The IP datagram handler 2141 buffers the IP datagram delivered from the TP handler 2133, and then extracts and analyzes a header of the buffered IP datagram, thereby recovering UDP datagram from a payload of the corresponding IP datagram. The recovered UDP datagram is outputted to the UDP datagram handler 2143.

If the UDP datagram is scrambled, the scrambled UDP datagram is descrambled by the descrambler 2142, and the descrambled UDP datagram is outputted to the UDP datagram handler 2143. For example, when the UDP datagram among the received IP datagram is scrambled, the descrambler 2142 descrambles the UDP datagram by inputting an encryption key and so on from the service protection stream handler 2146, and outputs the descrambled UDP datagram to the UDP datagram handler 2143.

The UDP datagram handler 2143 consists of an UDP datagram buffer and an UDP datagram parser. The UDP datagram handler 2143 buffers the UDP datagram delivered from the IP datagram handler 2141 or the descrambler 2142, and then extracts and analyzes a header of the buffered UDP datagram, thereby recovering data transmitted through a payload of the corresponding UDP datagram. If the recovered data is an RTP/RTCP datagram, the recovered data is outputted to the RTP/RTCP datagram handler 2144. If the recovered data is also an NTP datagram, the recovered data is outputted to the NTP datagram handler 2145. Furthermore, if the recovered data is a service protection stream, the recovered data is outputted to the service protection stream handler 2146. And, if the recovered data is an ALC/LCT stream, the recovered data is outputted to the ALC/LCT steam handler 2148. Also, when the recovered data is SMT section data, the recovered data output to the service signaling section handler 2123.

Since the SMT section or the service signaling channel that carries the SMT section is an IP datagram having a well-known IP destination address and a well-known destination UDP port number, the IP datagram handler 2141 and the UDP datagram handler 2143 can output data including the SMT section to the service signaling section handler 2123 without requiring additional information.

The RTP/RTCP datagram handler 2144 consists of an RTP/RTCP datagram buffer and an RTP/RTCP datagram parser. The RTP/RTCP datagram handler 2144 buffers the data of RTP/RTCP structure outputted from the UDP datagram handler 2143, and then extracts A/V stream from the buffered data, thereby outputting the extracted A/V stream to the A/V decoder 2161.

The A/V decoder 2161 decodes the audio and video streams outputted from the RTP/RTCP datagram handler 2144 using audio and video decoding algorithms, respectively. The decoded audio and video data is outputted to the presentation manager 2170. Herein, at least one of an AC-3 decoding algorithm, an MPEG 2 audio decoding algorithm, an MPEG 4 audio decoding algorithm, an AAC decoding algorithm, an AAC+ decoding algorithm, an HE AAC decoding algorithm, an AAC SBR decoding algorithm, an MPEG surround decoding algorithm, and a BSAC decoding algorithm can be used as the audio decoding algorithm and at least one of an MPEG 2 video decoding algorithm, an MPEG 4 video decoding algorithm, an H.264 decoding algorithm, an SVC decoding algorithm, and a VC-1 decoding algorithm can be used as the audio decoding algorithm.

The NTP datagram handler 2145 consists of an NTP datagram buffer and an NTP datagram parser. The NTP datagram handler 2145 buffers data having an NTP structure, the data being outputted from the UDP datagram handler 2143. Then, the NTP datagram handler 2145 extracts an NTP stream from the buffered data. Thereafter, the extracted NTP stream is outputted to the A/V decoder 2161 so as to be decoded.

The service protection stream handler 2146 may further include a service protection stream buffer. Herein, the service protection stream handler 2146 buffers data designated (or required) for service protection, the data being outputted from the UDP datagram handler 2143. Subsequently, the service protection stream handler 2146 extracts information required for descrambling from the extracted data. The information required for descrambling includes a key value, such as SKIM and LKTM. The information for descrambling is stored in the second storage unit 2147, and, when required, the information for descrambling is outputted to the descrambler 2142.

The ALC/LCT stream handler 2148 consists of an ALC/LCT stream buffer and an ALC/LCT stream parser. And, the ALC/LCT stream handler 2148 buffers data having an ALC/LCT structure, the data being outputted from the UDP datagram handler 2143. Then, the ALC/LCT stream handler 2148 analyzes a header and a header expansion of an ALC/LCT session from the buffered data. Based upon the analysis result of the header and header expansion of the ALC/LCT session, when the data being transmitted to the ALC/LCT session correspond to an XML structure, the corresponding data are outputted to an XML parser 2150. Alternatively, when the data being transmitted to the ALC/LCT session correspond to a file structure, the corresponding data are outputted to a file decoder 2162. At this point, when the data that are being transmitted to the ALC/LCT session are compressed, the compressed data are decompressed by a decompressor 2149, thereby being outputted to the XML parser 2150 or the file decoder 2162.

The XML parser 2150 analyses the XML data being transmitted through the ALC/LCT session. Then, when the analyzed data correspond to data designated to a file-based service, the XML parser 2150 outputs the corresponding data to the FDT handler 2151. On the other hand, if the analyzed data correspond to data designated to a service guide, the XML parser 2150 outputs the corresponding data to the SG handler 2165. The FDT handler 2151 analyzes and processes a file description table of a FLUTE protocol, which is transmitted in an XML structure through the ALC/LCT session.

The SG handler 2165 collects and analyzes the data designated for a service guide, the data being transmitted in an XML structure, thereby outputting the analyzed data to the service manager 2122.

The file decoder 2162 decodes the data having a file structure and being transmitted through the ALC/LCT session, thereby outputting the decoded data to the middleware engine 2164 or storing the decoded data in a third storage unit 2163. Herein, the middleware engine 2164 translates the file structure data (i.e., the application) and executes the translated application. Thereafter, the application may be outputted to an output device, such as a display screen or speakers, through the application presentation manager 2170. According to an embodiment of the present invention, the middleware engine 2164 corresponds to a JAVA-based middleware engine.

Based upon a user-input, the EPG manager 2171 receives EPG data either through the service manager 2122 or through the SG handler 2165, so as to convert the received EPG data to a display format, thereby outputting the converted data to the presentation manager 2170.

The application manager 2172 performs overall management associated with the processing of application data, which are being transmitted in object formats, file formats, and so on. Furthermore, based upon a user-command inputted through the UI manager 2173, the operation controller 2100 controls at least one of the service manager 2122, the EPG manager 2171, the application manager 2172, and the presentation manager 2170, so as to enable the user-requested function to be executed.

The UI manager 2173 transfers the user-input to the operation controller 2100 through the UI.

Finally, the presentation manager 2170 provides at least one of the audio and video data being outputted from the A/V decoder 2161 and the EPG data being outputted from the EPG manager 2171 to the user through the speaker and/or display screen.

As described above, the transmitting and receiving system and the broadcast signal processing method of the same according to the present invention have the following advantages.

The present invention can signal mapping information between an ensemble and a mobile service by using an FIC chunk, and can divide and transmit the FIC chunk into FIC segment units, thereby enabling the receiving system to perform quick service acquisition.

Additionally, by using the service guide bootstrapping information signaled to a guide access table (GAT), the service guide may be accessed, even if the service guide associated with the current mobile broadcast signal is transmitted to any one of the current mobile broadcast signal, a mobile broadcast signal of another channel, another broadcast network, and an interaction channel.

Moreover, the present invention may also receive the mobile service data without any error even in channels having severe ghost effect and noise. Furthermore, by inserting known data in a particular position (or place) within a data region and transmitting the processed data, the receiving performance of the receiving system may be enhanced even in a channel environment that is liable to frequent changes. Finally, the present invention is even more effective when applied to mobile and portable receivers, which are also liable to a frequent change in channel and which require protection (or resistance) against intense noise.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of receiving a broadcast signal in a receiver, the method comprising:

receiving a broadcast signal carrying mobile data, wherein the broadcast signal delivers signaling data for rapid service acquisition and an ensemble which is a collection of mobile services and is encoded with the same Forward Error Correction code, wherein the signaling data includes an identifier of the ensemble, wherein the ensemble includes a stream for a service signaling channel for delivering service signaling tables, wherein the service signaling tables includes a guide access table describing service guide (SG) data services present in a mobile broadcast;

demodulating the broadcast signal;

decoding the signaling data from the demodulated broadcast signal;

accessing the ensemble from the demodulated broadcast signal;

acquiring the guide access table from the accessed ensemble, wherein the guide access table includes service guide bootstrapping information providing parameters that are necessary for bootstrapping a service guide of the service guide data; and accessing the service guide by using the acquired service guide bootstrapping information and a mobile service of the accessed ensemble, wherein the service guide bootstrapping information includes service guide delivery network type information indicating whether service guide fragments of the service data are delivered through the same mobile broadcast where the guide access table is delivered or the service guide fragments of the service data are delivered through a different mobile broadcast from the mobile broadcast where the guide access table is delivered.

2. The method of claim 1, wherein the guide access table includes information about SG data service provider for a source, delivery network type of the SG data service, and access information for the source.

3. The method of claim 1, wherein the guide access table includes a service identifier of a SG data service and a transmission session identifier (TSI) of a File Delivery over Unidirectional Transport (FLUTE) session of an announcement channel of the SG data service.

4. The method of claim 3, wherein the guide access table includes a transport stream identifier of a broadcaster, a service identifier of a SG data service and a transmission session identifier (TSI) of a File Delivery over Unidirectional Transport (FLUTE) session of an announcement channel of the SG data service.

5. The method of claim 1, wherein the guide access table includes information for signaling service guide delivered through IP-based broadcast channel which is not included in the broadcast signal.

6. The method of claim 1, wherein the guide access table includes information for signaling service guide delivered through IP-based interaction.

7. A receiver for receiving a broadcast signal in a receiver, the receiver comprising:
a tuner for receiving a broadcast signal carrying mobile data, wherein the broadcast signal delivers signaling data for rapid service acquisition and an ensemble which is a collection of mobile services and is encoded with the same Forward Error Collection code, wherein the signaling data includes an identifier of the ensemble, wherein the ensemble includes a stream for a service signaling channel for delivering service signaling tables, wherein the service signaling tables includes a guide access table describing service guide (SG) data services present in a mobile broadcast;

a demodulator for demodulating the broadcast signal;

a decoder decoding the signaling data from the demodulated broadcast signal;

a first handler for accessing the ensemble from the demodulated broadcast signal;

a second handler for acquiring the guide access table from the accessed ensemble, wherein the guide access table includes service guide bootstrapping information providing parameters that are necessary for bootstrapping a service guide of the service guide data; and a third handler for accessing the service guide by using the acquired service guide bootstrapping information and a mobile service of the accessed ensemble, wherein the service guide bootstrapping information includes service guide delivery network type information indicating whether service guide fragments of the service data are delivered through the same mobile broadcast where the guide access table is delivered or the service guide fragments of the service data are delivered through a different mobile broadcast from the mobile broadcast where the guide access table is delivered.

8. The method of claim 7, wherein the guide access table includes information about SG data service provider for a source, delivery network type of the SG data service, and access information for the source.

9. The method of claim 7, wherein the guide access table includes a service identifier of a SG data service and a transmission session identifier (TSI) of a File Delivery over Unidirectional Transport (FLUTE) session of an announcement channel of the SG data service.

10. The method of claim 9, wherein the guide access table includes a transport stream identifier of a broadcaster, a service identifier of a SG data service and a transmission session identifier (TSI) of a File Delivery over Unidirectional Transport (FLUTE) session of an announcement channel of the SG data service.

11. The method of claim 7, wherein the guide access table includes information for signaling service guide delivered through IP-based broadcast channel which is not included in the broadcast signal.

12. The method of claim 7, wherein the guide access table includes information for signaling service guide delivered through IP-based interaction.

* * * * *